United States Patent
Morimoto

(10) Patent No.: US 8,638,467 B2
(45) Date of Patent: Jan. 28, 2014

(54) PRINT DATA GENERATING APPARATUS A PRINT DATA GENERATING METHOD

(75) Inventor: Nobuo Morimoto, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1774 days.

(21) Appl. No.: 11/644,588

(22) Filed: Dec. 22, 2006

(65) Prior Publication Data

US 2007/0146737 A1 Jun. 28, 2007

(30) Foreign Application Priority Data

Dec. 26, 2005 (JP) ................................ 2005-372350

(51) Int. Cl.
  *G06K 15/02* (2006.01)
(52) U.S. Cl.
  USPC .............................. 358/1.2; 358/1.1; 358/451
(58) Field of Classification Search
  USPC .......................... 358/1.1, 1.15, 1.9, 1.2, 451
  See application file for complete search history.

(56) References Cited

U.S. PATENT DOCUMENTS

| | | | |
|---|---|---|---|
| 2003/0081274 A1* | 5/2003 | Yamamoto | 358/504 |
| 2005/0030563 A1* | 2/2005 | Matsunami et al. | 358/1.9 |
| 2008/0273215 A1* | 11/2008 | Kadoi et al. | 358/1.9 |

FOREIGN PATENT DOCUMENTS

| | | |
|---|---|---|
| JP | 08-156327 | 6/1996 |
| JP | 08-314124 | 11/1996 |
| JP | 08-321843 | 12/1996 |
| JP | 10-171042 | 6/1998 |
| JP | 2005-062320 | 3/2005 |
| JP | 2005-110000 | 4/2005 |
| JP | 2005-242640 | 9/2005 |

\* cited by examiner

*Primary Examiner* — King Poon
*Assistant Examiner* — Iriana Cruz
(74) *Attorney, Agent, or Firm* — Nutter McClennen & Fish LLP; John J. Penny, V.

(57) ABSTRACT

A designator is operable to designate image data indicative of an image. A setting provider is operable to provide a print size condition determining a print size of the image and a first image quality condition determining a first print image quality of the image. A first generator is operable to generate print data indicative of a printed image which is obtained by subjecting the image data to processing corresponding to 1) magnification of the image based on the print size condition, and 2) execution of image processing on the image based on the first image quality condition, which are executed in a predetermined order. A specifier is operable to specify at least one part of the image. A second generator is operable to generate trial print data indicative of at least one trial printed image which is obtained by subjecting the image data to processing corresponding to 1) trimming of the part of the image, 2) magnification of the image based on the print size condition, and 3) execution of image processing on the image based on the first image quality condition. An order that the magnification and the image processing are executed by the second generator is the same as the predetermined order.

16 Claims, 14 Drawing Sheets

PRINT DATA GENERATING APPARATUS A PRINT DATA GENERATING METHOD

The disclosures of Japanese Patent Application No. 2005-372350 filed on Dec. 26, 2005 including specification, drawings and claims are incorporated herein by reference in its entirety.

BACKGROUND OF THE INVENTION

The present invention relates to a print data generating apparatus, a print data generating method and a program which have the function of generating print data from image data such as a printer driver, and more particularly generate print data on a partial image obtained by cutting out a part of an image.

In recent years, for example, an image obtained by photographing by means of a digital camera is photoprinted by using a recording apparatus such as an ink jet printer. The photoprinting is mainly carried out in a comparatively small paper size such as 4"×6" size, 5"×7" size or a postcard size. For example, large-size photoprinting for a poster is carried out with a print paper having a large size in some cases. A glossy paper is used for the photoprinting and is expensive. In the case in which the large size printing is carried out, furthermore, a large amount of ink is also consumed.

The quality of completion of the photoprinting is greatly varied depending on a print condition. For example, in a printer driver attached to a printer, it is possible to select a print quality (a resolution) from 5760 dpi, 2880 dpi, 1440 dpi and 720 dpi, to select a gamma value for determining a contrast from a plurality of set values, and furthermore, to select any of a plurality of intents for determining a tone. For this reason, a trial print is carried out to determine the print condition.

In the case in which the trial print is carried out and photoprinting is performed in a small paper size, however, a price of the paper and the amount of consumption of ink are not great problems even if several sheets are printed. In the case in which the photoprinting is carries out in a large size such as a poster, an expensive photographic paper having a large size and a large amount of ink are consumed. Consequently, a photoprinting cost is very high.

For example, Japanese Patent Publication No. 8-156327 and Japanese Patent Publication No. 8-321843 have disclosed a printer capable of carrying out a draft print before a real print. By carrying out the draft print, it is possible to generally imagine a result of the real print.

Moreover, Japanese Patent Publication No. 2005-110000 has disclosed a photographic image printing apparatus for displaying a photographic image on a monitor of a personal computer and setting a trimming frame in the photographic image thus displayed, and cutting out the photographic image through a trimming frame, thereby printing the photographic image. According to the apparatus, it is possible to trim a desirable portion from the image, thereby printing the trimming image. Therefore, it is possible to carry out the trial print over a part of the image.

Furthermore, Japanese Paten Publication No. 2005-62320 (Paragraphs [0040] to [0049], FIGS. 2 to 8) has disclosed a trial print creating system for scanning a photographic film and displaying a read image on display means, setting a region to be subjected to a trial print from an image over a screen of the display means, extracting a trimming image specified by the region, and exposing, developing and printing an image having the trimming images arranged onto a roll-shaped photosensitive material. In the system, trimming means operably displays a frame having a predetermined shape or a plurality of markers on the display means and sets a region surrounded by the frame or a region surrounding a line connecting the markers as a trial print region. Moreover, at least one of information for specifying the trimming image and information about the print condition of the trimming image is synthesized to carry out the trial print corresponding to the trimming image. Japanese Patent Publication No. 2005-242640 has disclosed a face detecting apparatus for detecting a face from a photographic image.

As in the Japanese Patent Publication No. 8-156327 and the Japanese Patent Publication No. 8-321843, however, even if the draft print is carried out in order to perform the trial print, a print resolution is low and a pixel is rough. Therefore, it is impossible to decide the picture quality of a real print. In addition to the print resolution to be set to the real print, it is impossible to determine an optimum print condition (particularly, a picture quality condition) for the real print, for example, a gamma value or an intent. For this reason, even if the real print is carried out on the optimum picture quality condition decided by seeing the print picture quality of the draft print, a desirable print picture quality cannot be obtained in the real print.

As in the Japanese Patent Publication No. 2005-110000, moreover, a part of an image can be trimmed (cut out) and trial printed. However, a print image is printed by executing a magnification change processing of enlarging and reducing an image to have a print size corresponding to a paper size to be used. Therefore, there is a problem in that an equivalent print picture quality to the real print cannot be obtained if a magnification of the magnification change processing is varied between the real print and the trial print. In the case in which the magnification change processing is carried out at a different magnification from the magnification of the real print to perform the trial print, for example, the conditions of various image processings such as a smoothing processing to be started in a process for converting a resolution of an original image into a set print resolution (for example, an interpolating processing condition of a pixel and a thinning rate of the pixel) are changed corresponding to a variation in a magnification even if the print is carried out at an identical print resolution. As a result, an apparent print picture quality is coarse or dense. Thus, there is a problem in that the same print picture quality as that of the real print cannot be obtained. As a matter of course, a trimming image size may be regulated in such a manner that a magnification of the trial print is coincident with that of the real print. However, it is the most difficult task to regulate a size through a manual operation, which is actually impossible. For this reason, conventionally, there is only a method of carrying out the trial print by using a large size paper used in the real print.

Referring to a technique described in the Japanese Patent Publication No. 2005-62320, moreover, a scan image has a predetermined resolution. Therefore, a picture quality of a photograph obtained by exposing, developing and printing the image onto a photosensitive paper depends on a resolution of a scanner, and as a matter of course, is different from a picture quality of a photograph in the real print which is obtained by an exposure and development using a photographic film. For this reason, it is possible to determine the print conditions (exposing and developing conditions) of the real print by seeing the picture quality of the photograph for the trial print; which is not sufficient. In the technique descried in the Japanese Patent Publication No. 2005-62320, moreover, it is possible to obtain a desirable picture quality of a photograph if the optimum exposing and developing conditions are determined. In case of an apparatus for generating print data from image data by an image processing as in a printer such as an ink jet type printer, however, there is a unique problem in that the conditions of the other image processing such as a smoothing processing are changed so that the same print picture quality as that of the real print cannot be obtained when the magnification of the magnification change processing is varied between the trial print and the real print as described above. As a result, in the case in which a photographic image having a high print quality is demanded, there is only a method of carrying out the trial print in the same print size as that in the real print.

SUMMARY OF THE INVENTION

It is therefore an object of the invention to provide a print data generating apparatus and a print data generating method which can generate print data capable of printing a part of an image in almost the same print picture quality as that in a real print. Meanwhile, the real print is used in this specification as a term to be compared with the trial print for printing the part of an image and indicates a print for a whole image to be a print object.

In order to achieve the above described object, according to the invention, there is provided a print data generating apparatus comprising:

a designator, operable to designate image data indicative of an image;

a setting provider, operable to provide a print size condition determining a print size of the image and a first image quality condition determining a first print image quality of the image;

a first generator, operable to generate print data indicative of a printed image which is obtained by subjecting the image data to processing corresponding to 1) magnification of the image based on the print size condition, and 2) execution of image processing on the image based on the first image quality condition, which are executed in a predetermined order;

a specifier, operable to specify at least one part of the image; and a second generator, operable to generate trial print data indicative of at least one trial printed image which is obtained by subjecting the image data to processing corresponding to 1) trimming of the part of the image, 2) magnification of the image based on the print size condition, and 3) execution of image processing on the image based on the first image quality condition, wherein:

an order that the magnification and the image processing are executed by the second generator is the same as the predetermined order.

It is not limited that each of the processes including the magnification and the image processing is wholly executed at one time. The each of the processes may be partly executed at one time. For example, the magnification may be executed after executing a part of the image processing, then the other part of the image processing may be executed. The predetermined order may include an order described above. The image processing includes a halftone processing and a color space conversion processing. In addition, it is not limited that the trimming is executed before executing the magnification and the image processing. Namely, the trimming may be executed after executing the magnification and the image processing. In a case where the trimming is executed before executing the magnification and the image processing, the magnification and the image processing can be quickly executed. On the other hand, in a case where the trimming is executed after executing the magnification and the image processing, the image quality of the trail printed image can be similar to the image quality of the printed image.

The first print size condition serves to determine the print size and also serves to determine a magnification rate obtained when the image is magnified to the print size, and the first print size condition includes a paper size, types of a rimless print or a margin print, and a blank condition, for example. The first image quality condition serves to determine the first print image quality (a print resolution, a contrast, a tone and a lightness) and includes a print resolution (a print quality), a gamma—an intent and a reference color (a color space), for example.

Consequently, the at least one part of the image designated as the print object is specified by the specifier. Moreover, the first print condition is set by the setting provider. At this time, at least the first print size condition for the real print is set. The second generator carries out processing corresponding to trimming of the part of the image which is specified by the specifier, magnification of the trimmed part of the image, and execution of image processing on the trimmed part of the image based on the first image quality condition. In the magnification, the magnification rate is equal to a magnification of the real print which is determined based on the first print size condition of the real print (a magnification rate at which the image is magnified (enlargement or reduction) corresponding to the print size which is determined from the first print size condition such as a printing medium size). And an order that the magnification and the image processing are executed by the second generator is the same as the predetermined order. The trial print data are output to the printer and the printer prints the part of the image based on the trial print data. A print image of the part of the image (which will be hereinafter referred to as a "partial print image") is subjected to the magnification at the equal magnification rate to that in the real print. Therefore, an apparent resolution of the partial print image (an apparent resolution at which a pixel of the print image is seen to be rougher when the magnification rate is increased even if a print resolution is equal) can be caused to be equal to that in the real print. For example, when the magnification rate is varied so that the resolution obtained after the magnification is different, the other image processing conditions such as smoothing to be carried out later are changed so that an actual print image is caused to be different from that in the real print. In the invention, however, the real print and the trial print are subjected to the magnification at the equal magnification, which is suitable for the trial print for deciding the picture quality of the real print. Moreover, the partial print image is formed by the execution of the image processing based on the same picture quality condition as that in the real print or the picture quality condition set separately from the real print. By confirming the picture quality of the partial print image, therefore, it is possible to properly decide whether the picture quality condition is suitable for the real print or not. In the generation of the trial print data, the magnification and the image processing are carried out in the same order as that of the real print. Consequently, the print picture quality in the real print is reflected almost accurately in the trial print. Furthermore, the trial print serves to simply print the part of the image at the equal magnification rate to that in the real print. As compared with the case in which the trial print is carried out in an equal print size to that in the real print, therefore, it is possible to reduce the amounts of consumption of a print medium such as a paper and ink.

The magnification may be executed by the first and the second generator or by the other magnification change processing portion to which necessary information for the magnification may be given. The other magnification changing portion includes a magnification function possessed by an OS (operating system) or an application which is provided in a host computer. Moreover, the magnification is not restricted to changing a magnification of an image to have a print size but may be a magnification processing of regulating an image resolution of an image to have such an image resolution as to have a print size when the image resolution obtained after the magnification change processing is converted into a print resolution.

The print data generating apparatus may further comprise:
a print section, operable to print at least one of the image and the part of the image based on at least one of the print data generated by the first generator and the trial print data generated by the second generator.

The print data generating apparatus may further comprise:
a preview provider, operable to display the image as a preview image on a display such that at least one area on the preview image is displayed in a distinguishable manner; and
a display controller, operable to change a position of the at least one area on the preview image in accordance with a user's input,
wherein the specifier is operable to correspond the at least one area on the preview image to the at least one part of the image.

With this configuration, when the image is specified as the print object based on the input from the input device, for example, the preview provider acquires data on the specified image and causes the display device to display the preview image in the state in which at least one area of the image can be distinguished. Based on the input from the input device, the position of the area displayed on the preview image is changed by the display controller so that a part of an image corresponding to the region on the preview image can be specified as a trial print object. More specifically, the area cut out of the image data by the second generator is determined by specifying the area.

The setting provider may be operable to provide a trial print size condition determining a size of the part of the image.

The area on the preview image may be displayed on the display so as to correspond to the size of the part of the image.

With this configuration, the trial print size condition of the trial print for the part of the image is also set by the setting provider. The area displayed on the preview image by the preview provider is displayed in such a size that the print size of the print data generated by the second generator by setting the area is almost equal to the trial print size to be such a size as to carry out the trial print determined from the trial print size condition. Accordingly, it is possible to properly carry out the trial print by simply selecting the position of the region to be a desirable position without requiring to regulate the size of the region.

The trial paper size to be a size of a paper on which the part of the image is printed and the trial print size for printing the part of the image are set by the setting provider based on the input from the input device. Examples of information input from the input device in order to set the trial print size include information about "a trial print size" itself and "an N-up print" and "a 1/N size of a trial paper size" which are determined by the trial print size in relation to the trial paper size.

The print data generating apparatus may further comprise:
a storage, storing a size of a standard-sized available sheet, wherein:
the second generator is operable to generate trial print data indicative of at least one trial printed image which is printed on the standard-sized available sheet based on the size stored on the storage.

The storage stores paper size names such as A4, 5"×7" size, and 4"×6" size which are corresponding to the sizes of the standard-sized available sheet. The size of the standard-sized available sheet on which the part of the image is printed is specified by inputting the paper size name. By carrying out the print over the standard-sized available paper, it is not necessary to input the paper size in a numeral (for example, a length and a width). Thus, it is possible to easily carry out the trial print. In addition, even if the image is printed on non-standard-sized sheet, the part of the image may be printed on the standard-sized available sheet. Since the standard-sized sheet is available, a cost for the trial print can be reduced in a case where the trial print is executed many times.

The print data generating apparatus may further comprise:
a storage, storing a size of a standard-sized available sheet, wherein:
the second generator is operable to generate trial print data indicative of at least one trial printed image which is printed on the standard-sized available sheet based on the size stored on the storage.

The display controller may be operable to execute an analysis on the image in accordance with a keyword included in the user's input; and
the display controller may be operable to display the area on the preview image at a position determined by a result of the analysis.

With this configuration, it is possible to eliminate a subsequent operation for changing a position of the area or to set the same operation to be such a simple operation as to slightly change the position. Accordingly, the trial print operation is easy and simple.

The keyword may include at least one of a word "face", a color-related word, and a brightness-related word;
the controller may be operable to execute a face recognition processing as the analysis in a case where the word "face" is included in the keyword;
the controller may be operable to analyze a position in which a color specified by the color-related word is distributed as the analysis in a case where the color-related word is included in the keyword; and
the controller may be operable to analyze a position in which a brightness specified by the brightness-related word is distributed as the analysis in a case where the brightness-related word is included in the keyword If the color-related word such as the sky, the sea, a leaf or a skin is input, an area is displayed in a position of the sky (blue), the sea (blue), the leaf (green) or the skin (skin color) which represents a place in which the color is to be confirmed by the trial print, for example.

If the brightness-related word such as a shadow or a highlight is specified, an area is displayed in a position of the shadow or the highlight which represents a place in which the brightness is to be confirmed by the trial print, for example.

The image processing may be based on at least one of the first image quality condition and a second image quality condition;
the display controller may be operable to display a selection screen requiring to select one of the first image quality condition and the second image quality condition in a case where the second generator generates one of the trial print data based on the first image quality condition and the other one of the trial print data based on the second image quality condition, and an instruction causing the first generator to generate the print data is then received; and
the first generator may be operable to generate the print data by executing the image processing based on the second image quality condition, in a case where the second image quality condition is selected.

The first and second image quality condition is represented by at least one value. The value for the image quality condition indicates a numeric value ("gamma value" or "print resolution") if the image quality condition is "gamma" or "print resolution" and indicates a condition expressed in "saturation" or "perceptive" except for the numeric value if the picture quality condition is "tent".

With this configuration, it is possible to omit a time and labor for printing the partial image plural times for each of the different values (which represent at least the first and the second image quality condition respectively).

The second generator may be operable to generate the trial print data so as to include a text indicative of at least the first image quality condition.

With this configuration, it is possible to correspondingly grasp a printed image quality and an applied image quality condition. It is also possible to determine the optimum image quality condition from a text printed together therewith.

The display controller may be operable to display at least one of a first screen for causing the first generator to generate the print data and a second screen for causing the second generator to generate the trial print data.

With this configuration, it is possible to open the second screen (trial print setting screen) from the first screen (print setting screen for the real print), thereby carrying out the trial print if necessary. Moreover, it is possible to specify a desirable part of the image which is to be trial printed depending on the area while seeing the preview image. In addition, it is also possible to execute the trial print by giving the instruction for starting the trial print from the print setting screen for the real print.

The display controller may be operable to display at least one of the first screen and the second screen after the second generator generates the trial print data.

With this configuration, it is possible to subsequently carry out the trial print or the real print.

According to the invention, there is also provided a method for generating print data indicative of a printed image which is obtained by subjecting image data which is indicative of an image to processing corresponding to 1) magnification of the image based on a print size condition determining a print size of the image, and 2) execution of image processing on the image based on a first image quality condition determining a first print image quality of the image, which are executed in a predetermined order, the method comprising:

designating the image data;

setting the print size condition and the first image quality condition;

specifying at least one part of the image; and generating trial print data indicative of at least one trial printed image which is obtained by subjecting the image data to processing corresponding to 1) trimming of the part of the image, 2) magnification of the image based on the print size condition, and 3) execution of image processing on the image based on the first image quality condition, wherein:

an order that the magnification and the image processing are executed is the same as the predetermined order.

According to the invention, there is also provided a storage medium storing a program causing a computer to execute the method as set forth above.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

First Embodiment

Figure 1:
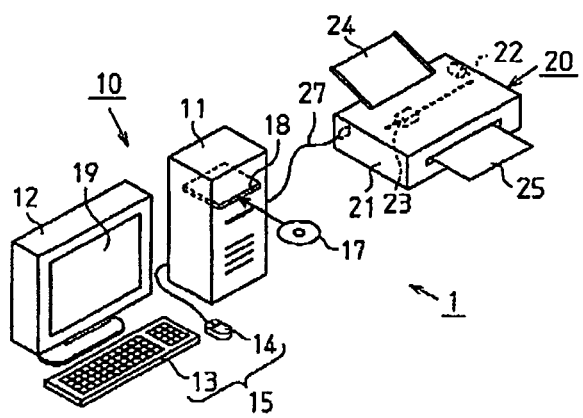
FIG. 1 is a perspective view showing a print system according to a first embodiment.

A first embodiment implementing the invention will be described below with reference to FIGS. 1 to 8. FIG. 1 shows a print system. As shown in FIG. 1, the print system 1 is constituted by a host computer 10 (for example, a personal computer) and a printer 20. The host computer 10 includes a body 11, a monitor 12 (display means), and an input device 15 (input means) constituted by a keyboard 13 and a mouse 14. The body 11 is provided with a reading device 18 (a CD/DVD driving device) constituted to freely insert and attach a storage medium 17 such as a CD-ROM and capable of reading stored data such as a program software from the storage medium 17 which is inserted and attached.

The storage medium 17 stores various programs required for generating print data to be output to the printer 20 and a printer driver program including set data, and the printer driver program is read by the reading device 18 and is installed in a hard disk 34 (see FIG. 2) provided in the body 11. A program capable of carrying out a trial print is incorporated in the printer driver program according to the embodiment. The printer driver program is installed so that a print data generating apparatus is constructed in the host computer 10. An installing method is not restricted to a method of carrying out read from the storage medium such as a CD-ROM but a method of carrying out an installation can also be employed through network means such as internet.

The printer 20 is an ink jet type printer capable of carrying out large-size photographic printing without a margin on fourth sides in the embodiment. A carriage 23 to be driven by a carriage motor 22 is provided in a body 21 of the printer 20 reciprocably in a primary scanning direction (a direction of a width of a paper), and a recording head (not shown) capable of discharging ink droplets from a large number of (for example, 90 to 180) nozzles for respective irk colors is provided in a lower portion of the carriage 23. A paper 25 is inserted from a paper tray 24 provided in a position close to a back face of the body 21 and is delivered in a secondary scanning direction (an orthogonal direction to the primary scanning direction) in the body 21. By alternately repeating the feed of the paper 25 in a predetermined amount and one scan of the carriage 23 moved in the primary scanning direction while discharging the ink droplet from the recording head, a printing operation is carried out over the paper 25.

For example, in the case in which an image displayed on a screen 19 of the monitor 12 is printed by using an application (application software) for drawing an image, the body 11 of the host computer 10 and the printer 20 are previously connected to each other through a communication cable 27. When an input device 15 is operated to give an instruction for printing the image displayed on the screen 19 from the application, a printer driver constructed in the body 11 acquires image data on the image specified as a print object from the application. Then, the printer driver generates print data from the image data thus acquired and the print data are transmitted (output) to the printer 20 through the communication cable 27 so that the printer 20 executes the printing operation in accordance with the print data.

Figure 2:
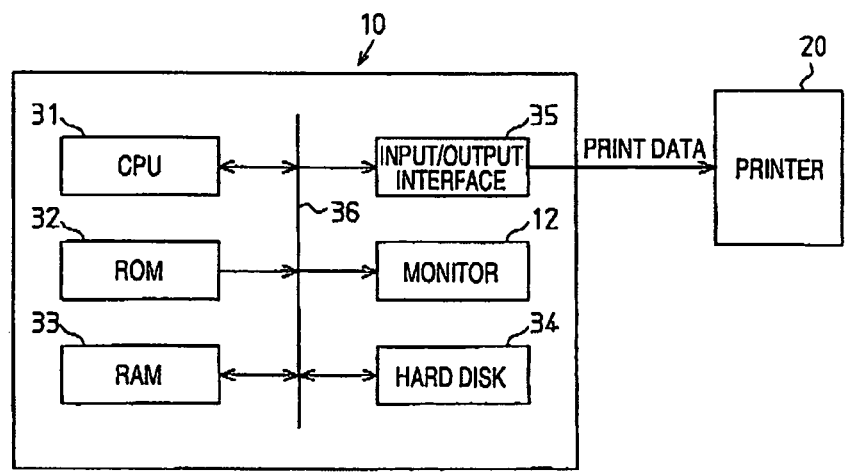
FIG. 2 is a block diagram showing an electrical structure of a host computer.

FIG. 2 is a block diagram showing an electrical structure of the host computer. As shown in FIG. 2, the host computer 10 includes a CPU 31 (a central processing unit), an ROM 32, an RAM 33, the hard disk 34, the monitor 12 and an input/output interface 35, and these are connected to each other through a bus 36.

The hard disk 34 stores the printer driver program, and furthermore, various programs such as an OS (operating system) and an application.

The RAM 33 is used as a memory area for temporarily storing a program to be executed by the CPU 31, various data required for executing the program and a result of a calculation.

The CPU 31 reads various programs from the hard disk 34 to the RAM 33 and executes them. For example, an application for displaying an image on the screen 19 of the monitor 12 is executed, and the printer driver program is executed in response to a print request received from the OS when an instruction for printing the image displayed on the screen 19 is given by an operation of the input device 15 through the application which is being executed. In the embodiment, for example, an application capable of drawing image data on a photograph taken by means of a digital camera (for example, JPEG data, BMP data) is installed. The ROM 32 stores a predetermined program and data which are required for causing the host computer 10 to function.

The printer driver constructed by the execution of the printer driver program through the CPU 31 generates print data based on image data on a photographic image specified to be printed in an application capable of drawing a photographic image, for example, and outputs the print data thus generated to the printer 20 through the input/output interface 35. The printer driver program according to the embodiment incorporates a trial printing program capable of carrying out a trial print for predetermining an optimum picture quality condition by using a photographic paper having a smaller paper size than that in a real print before a photograph having a large size such as a poster is really printed on a photographic paper having a large size by means of the printer 20.

Figure 3:
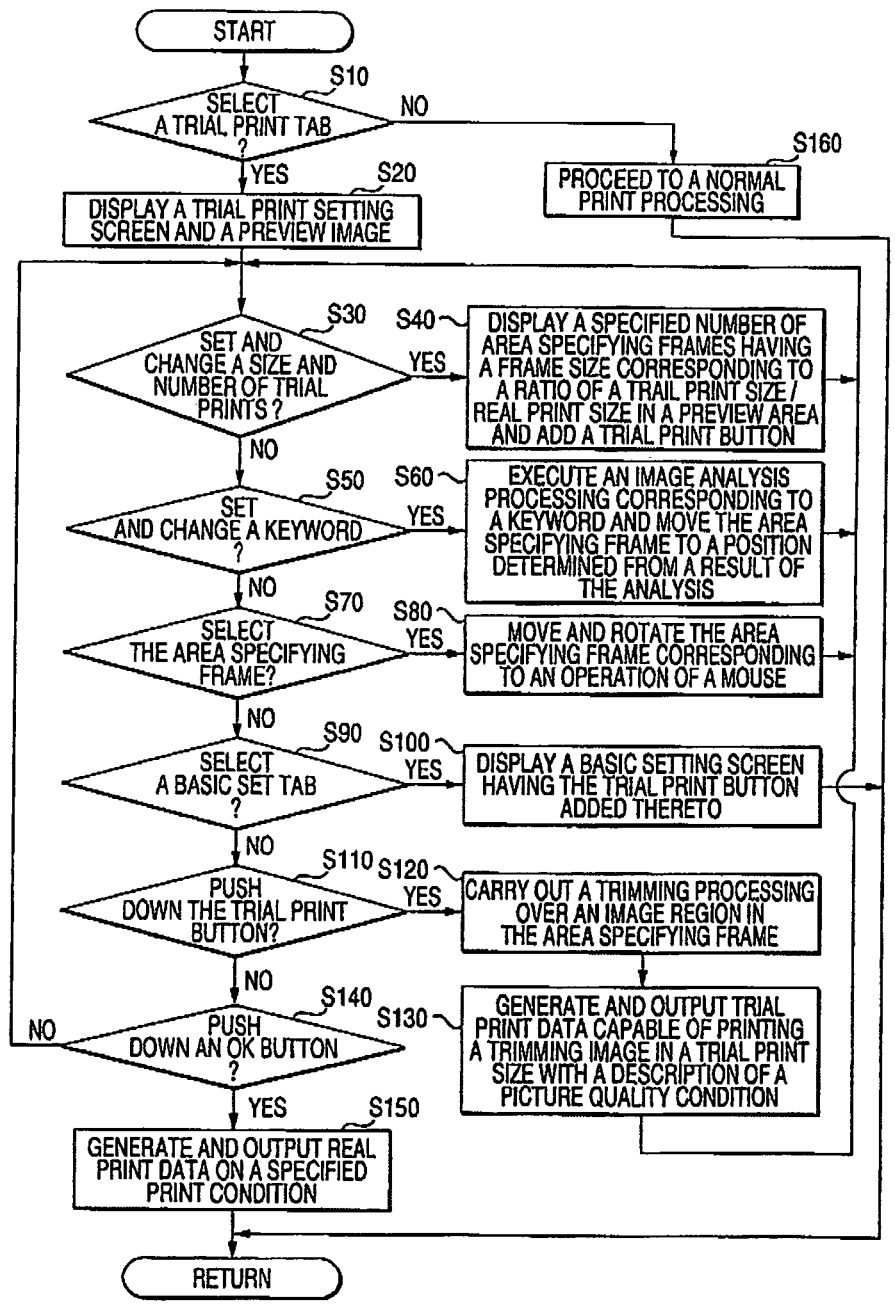
FIG. 3 is a flowchart showing a trial print processing routine.

A flowchart of FIG. 3 shows a program for the trial print. Image data on various setting screens (see FIGS. 4 to 6) to be displayed on the screen 19 when the program is executed are also installed together as a part of the trial printing program into the hard disk 34. In the embodiment, such a configuration as to add a function capable of selecting and executing a trial print condition is employed for the setting screen to be displayed in the execution of the real print. Therefore, the setting screen cannot be always divided into the real print and the trial print strictly. In the embodiment, a portion related to a trial print function in the printer driver will be referred to as a trial printing program for convenience.

Figure 4:
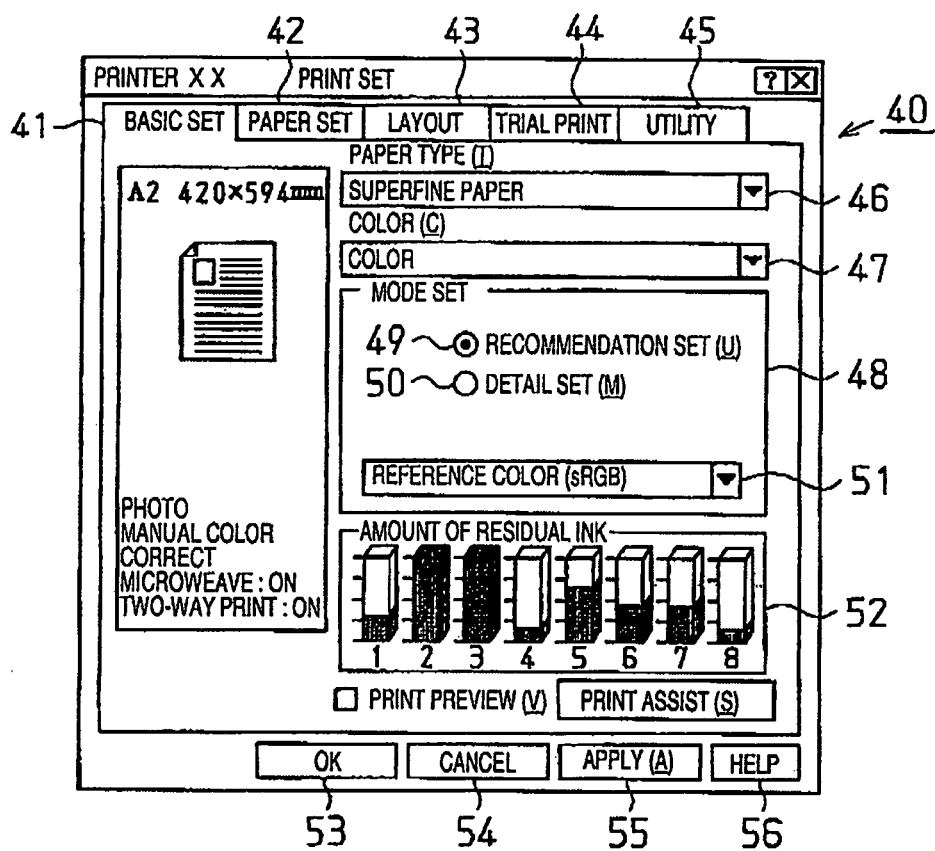
FIG. 4 is a typical view showing a basic setting screen.
Figure 5:
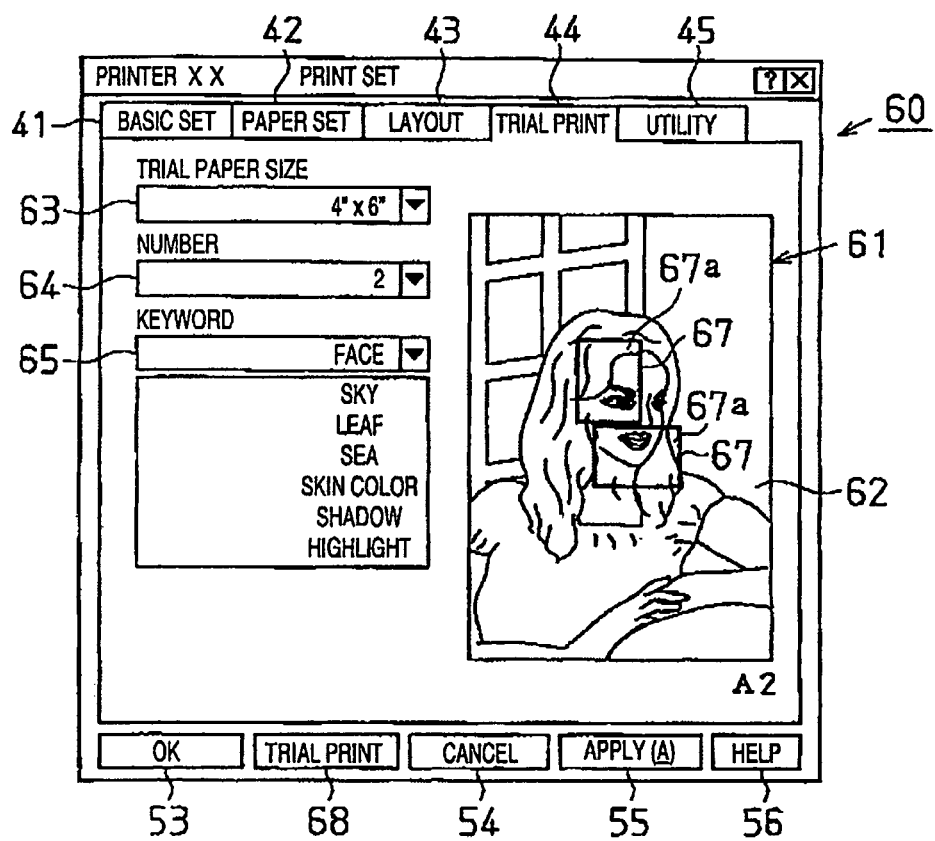
FIG. 5 is a typical view showing a trial print setting screen.
Figure 6:
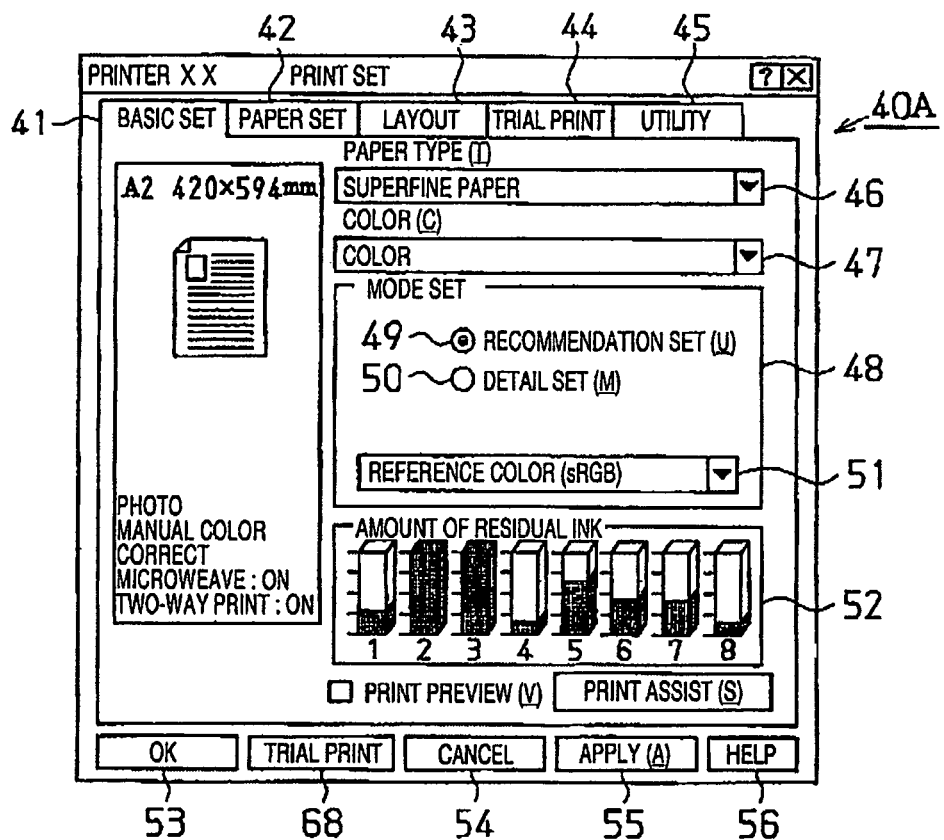
FIG. 6 is a typical view showing a basic setting screen to be displayed after a trial print is set.

Next, brief description will be given to structures of various setting screens shown in FIGS. 4 to 6. FIG. 4 shows a basic setting screen, FIG. 5 shows a trial print setting screen and FIG. 6 is a basic setting screen displayed after the trial print is set. First of all, the print setting basic screen will be described.

As shown in FIG. 4, a basic setting screen 40 has a plurality of selection tabs arranged in a line in a transverse direction on an upper part in a square display region and, in detail, a basic set tab 41, a paper set tab 42, a layout tab 43, a trial print tab 44 and a utility tab 45 are provided. The basic setting screen 40 shown in FIG. 4 is an initial screen to be first displayed on the screen 19 when carrying out an operation for inputting a printing instruction in an application. By selecting a desirable one of the tabs from the initial screen, a setting screen for the tab thus selected is displayed.

In the basic setting screen 40, there are "Paper type", "Color" and "Mode set" as input enable items for a print condition, and "Amount of residual ink" is displayed as confirmation information. In order to sequentially indicate the input enable items from a top in a right part in FIG. 4, there are prepared a pull-down menu 46 capable of selecting a paper type, a pull-down menu 47 capable of selecting a color, radio buttons 49 and 50 provided in a mode set column 48 and capable of selecting "Recommendation set" and "Detail set", and a pull-down menu 51 capable of selecting a reference color (a color space to be a reference). In an ink residual amount display column 52, moreover, the residual amounts of inks having eight colors are displayed in such an illustration configuration that they can be visually known in this example. The residual amounts of the ink are created by receiving ink residual amount information managed by the printer 20.

In the pull-down menu 46, it is possible to select a desirable one of "Superfine paper (highly glossy paper)", "Photomat paper", "Photographic paper (glossy paper)", "Photographic paper (silky-finish)" and "Plain paper" as the paper types. In the pull-down menu 47, it is possible to select one of "Color" and "Monochrome" as a color.

When the radio button 49 of the "Recommendation set" is selected, moreover, a print condition recommended previously on a manufacturer side is set. On the other hand, when the radio button 50 of the "Detail set" is selected, a display is switched into a detail setting screen (a manual setting screen) which is not shown and detail setting related to a picture quality condition can be manually carried out. Set items related to the picture quality condition in the detail setting screen include "Color adjust". In the "Color adjust", it is possible to select a color adjusting method from "Manual color correct", "No color correct" and "ICM", for example.

When the "Manual color correct" is selected in the "Color adjust", switching into a setting screen in a low order is carried out. Consequently, "Color correcting method" and "Gamma value" can be selected in a pull-down menu method respectively, and furthermore, numeric values of "Contrast" and "Saturation" having three colors of cyan, magenta and yellow can be specified to a positive or negative side continuously with respect to a reference value of "0" by sliding an operating portion which is displayed. In the pull-down menu of the "Color correcting method", one of "Reference color (sRGB)" and "Adobe RGB" can be selected. In the pull-down menu of the "Gamma value", one of "1.5", "1.8" and "2.2" can be selected. In the case in which the "Manual color correct" is selected, a print picture quality (particularly, a contrast) in the execution of a print is greatly influenced depending on a value to be selected as the "Gamma value".

When the "ICM" is selected in the "Color adjust", moreover, setting is carried out to implement ICM (Image Color Management) color matching of data and a print without depending on the application so that it is possible to specify "Input profile" and "Intent" in addition to a print profile in the printer driver. In a pull-down menu of the "Input profile", it is possible to select one of a plurality of input profiles (ICC profiles) which is prepared. In a pull-down menu of the "Intent", moreover, it is possible to select one of "Saturation", "Perceptive", "Relative color area maintain" and "Absolute color area maintain" which are preset. In the case in which the "ICM" is selected, the print picture quality (particularly, a tone) is greatly influenced in the print depending on the item to be selected as the "Intent". In the "Color adjust", thus, either the "Manual color correct" or the "ICM" can be selected. In the case in which the "Manual color correct" is selected, the "Gamma value" can be specified. In the case in which the "ICM" is selected, the "Intent" can be specified.

In FIG. 4, in a reference color pull-down menu 51, it is possible to select one of the "Reference color (sRGB)" and the "Adobe RGB" as a reference color as described in the detail setting screen. In the basic setting screen 40, various buttons are arranged in a line in a transverse direction on a lowermost end. In detail an OK button 53, a cancel button 54, an apply button 55 and a help button 55 are provided in order from left. When the mouse 14 is operated to push down the apply button 55, the selected print condition is applied (set). When the OK button 53 is pushed down, the real print is started (executed) on the applied print condition.

The tab will be described. When the paper set tab 42 is selected, switching into a paper setting screen is carried out so that a paper type and a paper size can be input and set. When the layout tab 43 is selected, moreover, switching into a layout setting screen is carried out so that it is possible to set a layout condition, for example, to select blank setting, a rimless print or a plural-up print. The trial print tab 44 is peculiar to the embodiment and there is displayed a trial print setting screen 60 shown in FIG. 5 which sets an image region to be trial printed and a paper size for the trial print. When the utility tab 45 is selected, there is displayed a setting screen capable of selecting a utility such as cleaning and selecting an execution of the utility thus selected.

Next, description will be given to the trial print setting screen 60 shown in FIG. 5. The trial print setting screen 60 is provided with a preview area 61 (a predetermined area) in a central right portion thereof. A preview image 62 of a photographic image specified to be printed in the application is displayed in the preview area 61. It is preferable that a thumbnail image having a low resolution should be displayed as the preview image 62. However, a real image having a high resolution may be displayed. Moreover, pull-down menus 63, 64 and 65 capable of selecting "Trial paper size" to be a size of a paper to be trial printed, "Number" for specifying the number of regions to be trial printed, and "Keyword" for specifying a keyword to analyze an image in the region to be trial printed from the keyword respectively are disposed in order from a top at the left side of the preview area 61.

In the pull-down menu 63 of the "Trial paper size", it is possible to select one of "4"×6"", "5"×7"" and "A4" as a trial paper size. "4"×6"", "5"×7"" and "A4" indicate an 4"×6" size, a 5"×7" size and an A4 size, respectively. In the pull-down menu 64 of the "Number", moreover, it is possible to select one of "1" to "10" as the number. In the pull-down menu 65 of the "Keyword", furthermore, it is possible to select "Face", "Sky", "Leaf", "Sea", "Skin color", "Shadow" and "highlight" as the keyword as shown in FIG. 5.

In the embodiment, when the trial print tab 44 is first selected over the basic setting screen 40, a blank that neither of the three pull-down menus 63, 64 and 65 is a default. In a state of the default, when the specific "Trial paper size" (for example, "4"×6"") is selected in the pull-down menu 63, and furthermore, the specific "Number" (for example, "2") is selected in the pull-down menu 64, an area specifying frame 67 having a frame size corresponding to the trial paper size (for example, "4"×6"") thus selected is displayed on the preview image 62 corresponding to the same number of the selected "Number" (for example, "2"). In this case, the selected number of area specifying frames 67 are simply displayed in a predetermined position on the preview image 62. Therefore, the mouse 14 is operated to move a mouse pointer onto the area specifying frame 67, thereby selecting the area specifying frame 67, and the mouse 14 is operated to move the area specifying frame 67 to a desirable position in the selecting state, thereby specifying a region to be trial printed through the area specifying frame 67. When the mouse 14 is operated to move the mouse pointer to a corner portion of the area specifying frame 67, moreover, a rotating operation mode is set and the mouse 14 is operated to move the corner portion so that the area specifying frame 67 can be rotated. Thus, the area specifying frame 67 can be disposed in optional rotating positions longitudinally, transversely and obliquely with respect to the preview image 62. By carrying out a rotating operation over the area specifying frame 67, a plurality of portions to be confirmed for a print picture quality through the trial print is easily disposed in the same trial paper size. Also in the trial print for a comparatively smaller number of sheets, therefore, it is possible to confirm print picture qualities in a comparatively large number of portions.

In the trial print setting screen 60, a trial print button 68 is added adjacently to the OK button 53 for executing the real print on the right side. When the mouse 14 is operated to push down the trial print button 68, a trial print for a partial image selected through the area specifying frame 67 is executed on the condition that a partial image to be a part of the preview image 62 is selected through the area specifying frame 67. In this case, if there is a plurality of area specifying frames 67, the trial print for the same number of sheets as the area specifying frames 67 is executed.

In a basic setting screen 40A shown in FIG. 6 which is displayed when the basic set tab 41 is selected to return to the basic setting screen 40 in a state in which setting is carried out to enable the trial print, for example, the pull-down menus 63 and 64 are set by the operation of the mouse 14 in the trial print setting screen 60 of FIG. 5, moreover, the trial print button 68 is added adjacently to the OK button 53 on the right side.

Figure 7:
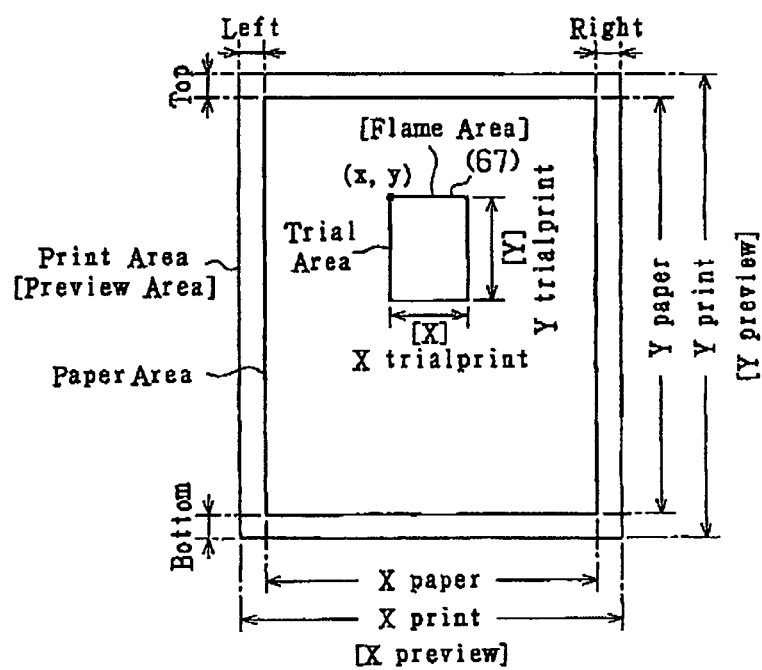
FIG. 7 is a layout view for explaining a method of calculating a display position and a frame size of an area specifying frame.

Next, a method of displaying the area specifying frame 67 will be described with reference to FIG. 7. FIG. 7 is a layout view for explaining a method of calculating a display position and a frame size of the area specifying frame.

In the embodiment, it is possible to set "four-side rimless print" on the layout setting screen (not shown) switched when the layout tab 43 is selected on the print setting screen. When the "four-side rimless print" is set, it is possible to carry out a rimless photographic print having no blank on four sides of a paper. Description will be given to a method of obtaining a frame size of the area specifying frame in the case in which the "four-side rimless print" is selected A transverse direction of the paper (a lateral direction in FIG. 7) is set to be an X direction and a paper delivery direction (a vertical direction in FIG. 7) is set to be a Y direction.

A length in the X direction and a length in the Y direction of a paper area PaperArea determined from a paper size (for example, an A2 size) of the real print which is selected in the basic setting operation are represented as "Xpaper" and "Ypaper", respectively. Moreover, a length in the X direction and a length in the Y direction of a print area (a print size) PrintArea in which the rimless print is carried out are represented as "Xprint" and "Yprint", respectively. In the case in which the rimless print is carried out, a predetermined amount of protrusion is preset to the outside of the four sides of the paper in such a manner that the rimless print can be carried out without a blank even if a paper delivery position is varied vertically and transversely, and the print area PrintArea is determined from the paper size and the amount of protrusion. The dimensions Xprint and Yprint in the X and Y directions of the print area PrintArea are expressed in the following manner, wherein the amounts of protrusion on upper, lower, left and right sides of the paper are represented as "Top", "Bottom", "Left" and "Right" respectively.

$$X\text{print} = X\text{paper} + \text{Left} + \text{Right} \quad (1)$$

$$Y\text{print} = Y\text{paper} + \text{Top} + \text{Bottom} \quad (2)$$

When an image is subjected to the rimless print in the real print, a part of four-side peripheral edges corresponding to the amount of protrusion in the print area PrintArea is not printed. A whole image of the print area PrintArea is preview displayed as the preview image 62. FIG. 7 shows a print image system and a preview image system is shown in [ ]. Referring to a relationship between the print image system and the preview image system, the print area PrintArea corresponds to the preview image area PreviewArea and the print area TrialArea corresponds to the frame area FlameArea.

Dimensions in the X and Y directions of the preview image area PreviewArea corresponding to the whole image of the preview image system are represented as Xpreview and Ypreview, respectively. Moreover, it is assumed that the dimensions in the X and Y directions of the trial print area TrialArea corresponding to the partial image of the print image system are represented as Xtrialprint and Ytrialprint, respectively. Consequently, the dimensions "X" and "Y" in the X and Y directions of the frame area FlameArea corresponding to the area specifying frame 67 are expressed in the following manner.

$$X = X\text{trialprint}/X\text{print} \cdot X\text{preview} \quad (3)$$

$$Y = Y\text{trialprint}/Y\text{print} \cdot Y\text{Preview} \quad (4)$$

In case of the example in which the trial print is always set to be the "four-side rimless print" irrespective of the layout set for the real print, the trial print area is equal to the trial paper size. For example, the dimensions "X" and "Y" in the X and Y directions of the frame area FlameArea are expressed in the following manner, wherein the dimensions in the X and Y directions of the trial paper size are represented as Xtrialpaper and Ytrialpaper, respectively.

$$X = X\text{trialpaper}/X\text{print} \cdot X\text{preview} \quad (5)$$

$$Y = Y\text{trialpaper}/Y\text{print} \cdot Y\text{preview} \quad (6)$$

As is apparent from (3) and (4), a frame size (X, Y) of the area specifying frame 67 has a value obtained by multiplying a preview image size (Xpreview, Ypreview) by a ratio (=trial print size/print size) of the trial print size (Xtrialprint, Ytrialprint) to the print size sprint, Yprint). In case of the "four-side rimless print", particularly, the frame size (X, Y) of the area specifying frame 67 has a value obtained by multiplying the preview image size (Xpreview, Ypreview) by a ratio (=trial paper size/print size) of the trial paper size (Xtrialpaper, Ytrialpaper) to the print size (Xprint, Yprint) as is apparent from (5) and (6).

In the case in which the real print is not the "four-side rimless print" but the "normal print" having a blank, moreover, top, bottom, left and right margins are represented as "Mtop", "Mbottom", "Mleft" and "Mright" respectively and X and Y in the equations (3) and (4) (or the equations (5) and (6)) are calculated by using "Xprint" and "Yprint" expressed in the following equations respectively in place of the equations (1) and (2).

$$X\text{print} = X\text{paper} - M\text{left} \cdot M\text{right} \quad (7)$$

$$Y\text{print} = Y\text{paper} - M\text{top} \cdot M\text{bottom} \quad (8)$$

As a matter of course, it is also possible to employ a structure in which the trial print is set to be layout setting depending on the layout setting of the real print. For example, if the real print is "normal print", a margin having an equal ratio to that of margin setting for the real print or a margin subjected to default setting for the trial print is provided, and Xprint and Yprint determined from the equations (7) and (8) are used in the equations (3) and (4), and furthermore, the trial print size is represented as Xtrialprint=Xtrialpaper−Xleft−Xright and Ytrialprint=Ytrialpaper−Ytop−Ybottom to calculate X and Y. Xleft, Xright, Ytop and Ybottom represent amounts of the left, right, top and bottom margins in the trial print. If the real print is the "four-side rimless print", moreover, the trial print is also set to be the "four-side rimless print" and X and Y are calculated in accordance with (5) and (6).

Moreover, a position of each of rectangular regions of the paper area, the print area and the area specifying frame is expressed in coordinates of a left and upper corner in the rectangular region. An origin of the coordinates is set to a left and upper position from a point representing position coordinates of the print area, for example, coordinates of the position of each rectangular region in the print area are represented as X and Y coordinate values taking positive values with respect to the origin (rightward and lower directions in FIG. 7 are set to be X and Y positive directions, respectively).

The area specifying frame 67 is displayed in a frame size setting, as each dimension in the X and Y directions, "X" and "Y" thus calculated based on the equations (3) and (4) (or the equations (5) and (6)). Even if the setting conditions for the paper size and the trial paper size are the same, accordingly, the frame size of the area specifying frame 67 displayed on the preview image 62 is varied for the "four-side rimless print" and the "normal print".

When the rimless print is carried out in the real print, moreover, an image is enlarged (a magnification is changed) to have the sizes of Xprint and Yprint. A region having the size (X, Y) on the specified position coordinates (x, y) are cut out (trimmed) as the trial print area TrialArea from the enlarged print area PrintArea. In the case in which the enlargement processing (the magnification change processing) is carried out on the printer driver side, it is necessary to carry out the enlargement processing over the whole image if the enlargement processing is carried out earlier. For this reason, actually, there is taken a procedure for cutting out partial image data corresponding to the trial print region from the image data and then carrying out the enlargement processing at an equal magnification to that in the real print over the partial image data thus cut out.

More specifically, the region having the size (X, Y) on the specified position coordinates (x, y) are cut out (trimmed) as the trial print area TrialArea from the image data. At this time, in case of the "four-side rimless print", the region is cut out in a position and size obtained by adding the amount of protrusion to the size (X, Y). Referring to the partial image data thus cut out, the magnification change processing (enlargement processing) is carried out at an equal magnification to that for varying an image over the print size of the real print which is determined from the print size conditions including the "paper size" for example, the A2 size) in the real print, a type of the "four-sided rimless print" or the "normal print", and the "margin condition". The setting is originally carried out by using the area specifying frame 67 having the frame side set to take an equal size to the trial print size (or the trial paper size) when the partial image data are subjected to the magnification change processing at an equal magnification to that in the real print. Therefore, the partial image data subjected to the enlargement processing are set to have an equal size to the trial print size (or the trial paper size).

Moreover, the magnification change processing may be carried out the OS side by previously processing image data acquired from an application to have such an image resolution as to take the print size in a conversion of an image resolution into a print resolution on the printer driver side and transferring the image data to the printer driver through the OS recognizing a print size and a print resolution which are determined from the print size condition set in the printer driver. In cast of such a structure that the magnification change processing is carried out by the OS or the application, thus, there is a method of receiving whole image data obtained after the magnification change processing and cutting out a partial image having a size specified by the area specifying frame 67 having the frame size determined from the equations (3) and (4) (or the equations (5) and (6)) (in the example in which the trial print for the partial image is carried out in the "four-side rimless print", a larger size corresponding to the amount of protrusion on the outside of the four sides than the frame size). As another method, moreover, the OS is informed of information about the position and size of the partial image (cut-out information) and information about the print resolution and the printer driver receives, from the OS, the partial image data obtained by cutting out the region of the position and size which is specified from the image data based on the information at such a predetermined image resolution as to have the trial print size in a conversion into the print resolution on the printer driver side. The partial image data obtained by any of the methods are also set to have an image size which is equivalent to the trial print size if the image resolution is converted into the print resolution.

FIG. 3 is a flowchart showing a program incorporated as a part of the printer driver for the trial print. In accordance with the flowchart of FIG. 3, description will be given to the trial print processing to be executed by the CPU 31. When an image displayed on-the screen 19 of the monitor 12 is selected to give an instruction for the print by the application, the printer driver displays the basic setting screen 40 shown in FIG. 4 which can set the print condition.

At Step S10, first of all, it is decided whether the trial print tab 44 is selected or not. If the trial print tab 44 is selected, the processing proceeds to Step S20. If the trial print tab 44 is not selected, the processing proceeds to Step S160 and the processing proceeds to a normal print processing routine. In other words, in the basic setting screen 40 of FIG. 4, there are executed a processing of setting a print condition which is carried out over a setting screen opened by selecting the tabs 42, 43 and 45 other than the trial print tab 44 and a print data generation processing to be started when the operation of the OK button 53 is accepted. If the trial print tab 44 in the basic setting screen 40 is selected also after the processing proceeds to the normal print processing, the processing returns to the trial print processing routine.

At Step S20, the trial print setting screen 60 and the preview image 62 are displayed. More specifically, the trial print setting screen 60 shown in FIG. 5 is displayed, and furthermore, image data on an image selected as a print object or a thumbnail image are/is read and the preview image 62 is displayed on the preview area 61 of the trial print setting screen 60. As shown in FIG. 5, the pull-down menu 63 for specifying "Trial paper size", the pull-down menu 64 for specifying "Number" and the pull-down menu 65 for specifying "Keyword" are prepared on the left side of the preview area 61 in the trial print setting screen 60.

At Step S30, it is decided whether the setting of the trial print size (trial paper size) and the number is changed or not. If the setting is changed, the processing proceeds to Step S40. If the setting is not changed, the processing proceeds to Step S50. For example, if the "4"×6" size" is selected as the Trial paper size" in the pull-down menu 63 and "2" is selected as the "Number" in the pull-down menu 64 in the trial print setting screen 60 as shown in FIG. 5, the processing proceeds to the Step S40. A size name ("4"×6"", "5"×7"" and "A4") displayed in the pull-down menu 63 and a paper size are caused to correspond to each other and are stored in a predetermined storage region (storage means) of the hard disk 34. A user does not need to input the paper size in a numeral but preferably selects the size name in the pull-down menu 63. Moreover, a trial paper which can be selected in the pull-down menu 63 is a standard-size paper which is easily available. Therefore, the trial print can easily be carried out.

At Step S40, the area specifying frame 67 having a frame size corresponding to a ratio of a trial print size/real print size is displayed in a specified number in the preview area 61 and the trial print button 68 is added. The frame size of the area specifying frame 67 is determined in such a size that the dimensions in the X and Y directions are X and Y calculated by the equations (3) and (4) (particularly, the equations (5) and (6) in a structure in which the trial print is always set to be the "four-side rimless print"), and the area specifying frame 67 is displayed in a frame size corresponding to the ratio of the trial print size/real print size with respect to the preview image 62 in the preview area 61. At this time, the area specifying frame 67 is displayed in a predetermined position (a default position) with a number (not shown) given thereto. When the processing of the Step S40 is ended, the processing returns to the Step S30. Each of decision processings at the Steps S30, S50, S70, S90, S110 and S140 serves to decide the presence of a predetermined input operation. When the pertinent input operation is carried out, next predetermined processings (S40, S60, S80, S100, S120 and S150) are executed. Referring to the decision processings at the Steps S30, S50, S70 and S110, the pertinent input operation is carried out. When the next predetermined processings are completed, the processing returns to the Step S30 again and loops in the trial print processing routine.

At Step S50, it is decided whether the setting of the keyword is changed or not. If the setting is changed, the processing proceeds to Step S60. If the setting is not changed, the processing proceeds to Step S70.

At the Step S60, the image analysis processing corresponding to the keyword is executed to move the area specifying frame 67 into a position determined as a result of the analysis. As the keyword, there are prepared "Face", "Sky", "Leaf", "Sea", "Skin color", "Shadow" and "Highlight" as shown in FIG. 5. In the case in which the "Face" is selected as the image analysis processing, a face recognition processing is executed. In the case in which any of the "Sky", the "Leaf", the "Sea" and the "Skin color" is selected, a color analysis processing of analyzing a corresponding color is executed. In the case in which the "Shadow" or the "Highlight" is selected, furthermore, a brightness analysis processing is executed for a corresponding brightness. When the image analysis processing specified by the keyword is executed to obtain a specific position determined from the keyword, the area specifying frame is moved to a position determined as a result of the analysis. As a result of the image analysis, for example, when a predetermined region corresponding to the keyword is obtained, display positions of a specific number of area specifying frames are obtained in order to include at least a part of the region. For example, if the specified number is "1", a position including all regions specified in the image analysis in the area specifying frame 67 having a predetermined size determined from a ratio of the trial paper size to the real print size or a position capable of including the region specified in the image analysis in the area specifying frame 67 at the highest occupation rate (%) (position coordinates of the left and upper corner of the area specifying frame 67) is calculated and the area specifying frame 67 is displayed in the position thus calculated.

The image analysis processing corresponding to the keyword is prepared. In the embodiment, there are three image analysis processings, that is, the face recognition processing, the color analysis processing and the brightness analysis processing. These three analysis processings will be described below. First of all, the face recognition processing will be described. The face recognition processing is carried out by a face recognizing device (a face detecting device) described in the Patent Document 5 which is constructed by installing a face recognizing program, for example.

The face recognizing device has a feature amount extracting portion for calculating a feature amount to be used for identifying a face from a photographic image, an identifying portion for identifying an image of a face with an image of a non-face by using a combination of the feature amounts, and a storage portion for storing reference data to which the identifying portion refers when identifying the image of the face with the image of the non-face.

The feature amount calculating portion calculates a gradient vector (that is, a direction in which a concentration in each pixel on a photographic image is changed and a size of the change) as the feature amount, for example. More specifically, each edge is detected in horizontal and perpendicular directions with respect to the photographic image, and a size of the gradient vector obtained from the size of the edge in each direction which is normalized is set to be the feature amount. The normalization is obtained by acquiring a histogram for a size of the gradient vector in all of pixels in the photographic image and smoothening the histogram in such a manner that the size is uniformly distributed to have a value which can be obtained by each pixel of the photographic image (0 to 255 in 8 bits). The feature amount calculating portion enlarges and reduces the photographic image because a size of a face included in the photographic image is varied, and moves a mask for each of the photographic images having different sizes (for example, 30×30 pixels) in order every pixel and extracts a feature amount for each of them.

The storage portion stores reference data defining identification conditions for identifying, as a face, a combination of the feature amounts in each pixel constituting each pixel group extracted by the feature amount extracting portion. The combination of the feature amounts and the identification conditions are predetermined by learning a sample image group constituted by a plurality of sample images which is known to be faces and a plurality of sample images which is known to be the non-face. There are various sizes and inclinations of the face included in the photographic image. Therefore, reference data are created by carrying out learning using a sample image obtained by inclining the face stepwise (or example, a unit of three degrees within an angle range of −15 to +15 degrees) in the respective face sizes having various pixel numbers for example, 9, 10 and 11 pixels) at a distance between the center of both eyes as a sample image which is known to be the face. The reference data are constituted by three types of reference data for a normal face recognition, a glass face recognition and a beard face recognition. As a matter of course, a reference of the identification is not restricted to the histogram form but binary data, a threshold or a function may be employed. In addition to the technique described above, for a learning method, it is also possible to use another machine learning technique such as a neural network.

The identifying portion has a normal face detecting portion, a glass face detecting portion and a beard face detecting portion which carry out a face recognition based on the combination of the feature amounts and the reference data and individually detect three types of faces. The normal face detecting portion identifies whether a face is included in a photographic image or not based on first reference data obtained by learning sample photographic images of many optional people and sample images which are known to be the non-face and the feature amount obtained by the feature amount calculating portion. The glass face detecting portion identifies whether a face is included in a photographic image or not based on second reference data obtained by learning sample photographic images of only faces of people having glasses and the sample images which are known to be the non-face and the feature amount calculated by the feature amount calculating portion. The beard face detecting portion identifies whether a face is included in a photographic image or not based on third reference data obtained by learning sample photographic images of only faces of people having a beard and the sample images which are known to be the non-face and the feature amount calculated by the feature amount calculating portion. The processing is executed in order of the normal face recognizing portion, the glass-face recognizing portion and the beard face recognizing portion, and is ended when the face is first recognized.

By executing the image recognizing device with respect to a photographic image (image data), it is possible to obtain, as the position coordinates of the left and upper corner, a position of an area specifying frame capable of including the detected face region at the highest occupation rate in the area specifying frame 67 having a frame size which is previously calculated when detecting a face portion (a face region) in the photograph.

In case of the color analysis processing, moreover, a specific color corresponding to each of the keywords "Sky", "leaf", "Sea" and "Skin color" is set. A region in which the specific color is distributed in the photographic image is detected by an image analysis. For example, the specific color is set with a slight range in an RGB gradation value and a region in an image which has the RGB gradation value within the range and has a pixel distributed is detected as a distribution region for the specific color. In the case in which there is a plurality of regions in which the particular color is isolated and distributed, for example, the largest continuous distribution region is selected with priority in descending order.

Referring to the bright analysis processing, moreover, a specific brightness corresponding to each of the keywords of "Shadow" and "Highlight" is set and a region having the specific brightness distributed in a photographic image is detected by the image analysis. For example, a specific small luminance value is set with a predetermined range as a specific brightness to the keyword of the "Shadow", and a great luminance value is set with a predetermined range as a specific brightness to the keyword of the "Highlight". A region in an image having an RGB gradation value to be a luminance value within the set range and having a pixel distributed is detected as a distribution region having a specific brightness. For example, in the case in which there is a plurality of regions in which the particular brightness is isolated and distributed, for example, the largest continuous distribution region is selected with priority in descending order.

When the image analysis processing corresponding to the specified keyword is carried out to specify a position, thus, the area specifying frame 67 is displayed (moved) in the specified position in such a frame size that a ratio of the frame size to a preview image size is equal based on a ratio (trial paper size/real print size) of a trial paper size to a real print size determined by a paper size and a printing method (without and with a margin).

It is possible to propose a method of exactly displaying a last used set condition as displayed contents when the trial print setting screen 60 is first displayed at the Step S20 and a method of displaying a predetermined default condition. In this case, when the trial print setting screen 60 is first displayed, a specified number determined from a condition set at that time and an area specifying frame having a frame size are displayed. With such a structure, the area specifying frame 67 is displayed on the last used condition or the default set condition. Therefore, it is not necessary to change the position of the area specifying frame 67 and there is a high possibility that a change in the position might be lessened. In this case, at the Step S20, the same processing as that in the Step S40 is carried out in order to determine the display position and size of the area specifying frame 67 and only the addition of the trial print button 68 is carried out when it is decided that either the trial paper size or the number is changed at the Step S30. As a matter of course, in the trial print setting screen 60, it is also possible to employ a structure in which the trial print button 68 is always displayed.

At the Step S70, it is decided whether the area specifying frame 67 is selected or not. If the area specifying frame 67 is selected, the processing proceeds to Step S80. If the area specifying frame 67 is not selected, the processing proceeds to Step S90.

At the Step S80, the area specifying frame 67 is moved and rotated depending on the operation of the mouse 14. For example, when the user operates the mouse 14 to select the area specifying frame 67 through the mouse pointer and exactly operates the mouse 14 in the selecting state, the area specifying frame 67 is moved to position coordinates corresponding to the operation of the mouse 14. When the user operates the mouse 14 to adjust the mouse pointer to the corner of the area specifying frame 67, moreover, a mode in which the area specifying frame 67 can be rotated is brought. When the mouse 14 is operated, the area specifying frame 67 is rotated in a rotating direction and a rotating amount which correspond to the operation. Thus, the user can dispose the area specifying frame 67 into a desirable position and direction by a manual operation through the mouse 14.

Thus, the processings of the Steps S30 to S80 are repeated corresponding to the input operation of the user. Consequently, there are determined a trial paper size and the number and positions of partial images to be trial printed which are desired by the user.

At the Step S90, it is decided whether the basic set tab 41 is selected or not. If the basic set tab 41 is selected, the processing proceeds to Step S100. If the basic set tab 41 is not selected, the processing proceeds to Step S110.

At the Step S100, the basic setting screen 40A having the trial print button 68 added thereto is displayed. More specifically, the basic setting screen 40A shown in FIG. 6 is displayed, and furthermore, the trial print button 68 which is not displayed on the first basic setting screen 40 is added. In FIG. 3, if the basic set tab 61 is selected to return to the basic setting screen, a processing of adding the trial print button 68 is carried out. It is also possible to display the basic setting screen 40A having the trial print button 68 added thereto only in the case in which any operation to obtain "YES" is carried out to confirm an intent of the trial print in any of the decision processings at the Steps S30, S50 and S70. In this case, at the Step S90, it is decided whether or not the basic set tab 41 is selected after any input operation related to the trial print is carried out in the trial print setting screen 60. After the processing of the Step S100 is ended, the processing basically proceeds to the normal print processing routine. By operating the trial print button 68, it is possible to execute the trial print by processings of Steps S110 to S130 which will be described below.

At the Step S110, it is decided whether the trial print button 68 is pushed down in the trial print setting screen 60 or not. If the trial print button 68 is pushed down, the processing proceeds to the Step S120. If the trial print button 68 is not pushed down, the processing proceeds to Step S140.

At the Step S120, an image region in the area specifying frame 67 is subjected to a trimming processing. More specifically, an image portion in a region corresponding to a portion in a frame region specified by the area specifying frame 67 is cut out (trimmed) from image data stored temporarily in the RAM 33 and image data of a partial image thus cut out (which will be hereinafter referred to as "trimming image data") are acquired. If a plurality of area specifying frames 67 is present, the same trimming processing is carried out for each of them, thereby acquiring a plurality of trimming image data. The trimming image data are stored in a predetermined storage region of the RAM 33.

At the next Step S130, trial print data capable of printing a trimming image in the trial print size are generated and output with a description of a picture quality condition. The picture quality condition influences a print picture quality obtained by the trial print and includes a print resolution (dpi), a gamma value and an intent. In the embodiment, these predetermined picture quality conditions are printed on a paper together with a print image obtained by the trial print (see FIG. 8). In the processing of the Step, a text of a number and a picture quality condition and a trimming image are synthesized to generate and output print data on the trimming image (trial print data) in such a manner that the text of the number and the picture quality condition shown in FIG. 8 is described and printed.

For example, if the "rimless print" is selected as one of the print conditions, the trimming image data are cut out (trimmed) as a region having a larger size corresponding to the amount of protrusion of the rimless print from the region specified by the area specifying frame 67. In other words, the image cut-out processing is carried out in such a manner that the whole region specified by the area specifying frame 67 is printed on the paper when the rimless print is performed. Then, the trimming image data thus cut out are subjected to an enlargement processing at a magnification of an image which is determined by the print condition of the real print. On the other hand, if the "margin print (normal print)" is selected as one of the print conditions, for example, the area specifying frame 67 is displayed in a size adjusted to a smaller print size corresponding to a margin than a paper size. Therefore, the trimming image data are cut out (trimmed) in the region specified by the area specifying frame 67. In other words, the image cut-out processing is carried out in such a manner that the whole region specified by the area specifying frame 67 is printed on the paper when the margin print is performed. Then, the trimming image data thus cut out are subjected to the enlargement processing at a magnification of an image determined by the print condition of the real print. The enlargement processing is executed for the trimming image data having a description of the picture quality condition (text) in a predetermined position.

Thereafter, a color conversion processing, a halftone processing and a microweave processing are sequentially carried out for the image data subjected to the enlargement processing as is executed by the printer driver in the normal print processing (the real print processing). Furthermore, raster data acquired through these processings are subjected to a command conversion processing and are converted into print data (PRN data) described in a peculiar command to the printer. An instruction for outputting the generated print data from the input/output interface 35 of the host computer 10 to the printer 20 is given. Thus, the trial print data are output to the printer 20 and the trial print for the partial image specified by the area specifying frame 67 is executed over a paper having the trial paper size in the printer 20.

Figure 8:
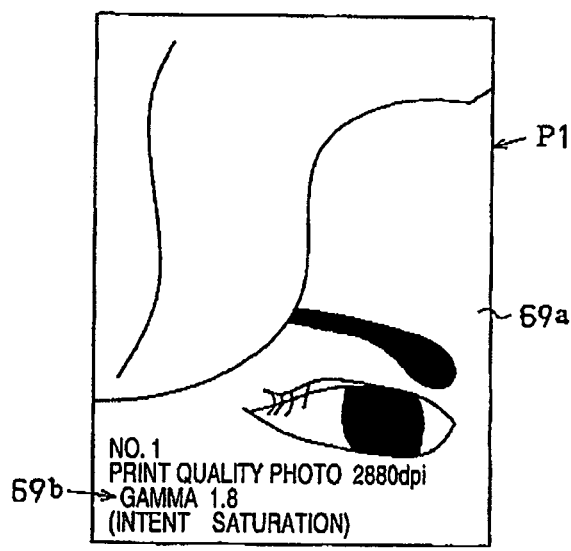
FIG. 8 is a typical view showing a print photograph.

As shown in FIG. 8, in a print photograph P1 obtained by the trial print, the partial image specified by the area specifying frame 67 is printed as a print image 69a and a text portion 69b with a description of a number and a picture quality condition is printed in a lower part of the print image 69a. In the example, a trial print number of "No. 1", a print quality of "Photo 2880 dpi" and a gamma of "1.8" are printed. Herein, there is printed the "gamma 1.8" to be a set value obtained by selecting the "Gamma" in the "Manual color correct" in the detail set displayed by selecting the radio button 50. For example, in the case in which the "Intent" is selected in the "ICM" of the detail set, the contents of the selected intent (for example, "Saturation") is printed in place of the "Gamma".

When the processing of the Step S130 is ended, the processing returns to the Step S30. In other words, the basic setting screen 40 disappears when the print job is completed in the real print, while the trial print setting screen 60 does not disappear but the display is maintained even if the trial print is completed in the trial print. The reason is that the real print has not been ended yet. The display of the trial print setting screen 60 or the basic setting screen 40A is maintained until the OK button 53 is pushed down to execute the real print or the cancel button 54 is pushed down in the basic setting screens 40 and 40A. By changing the partial image and the picture quality condition, therefore, the trial print can be repetitively carried out many times until the print condition of a final real print is determined.

At the Step S140, it is decided whether the OK button 53 is pushed down or not. If the OK button 53 is pushed down, the processing proceeds to Step S150. If the OK button 53 is not pushed down, the processing returns to the Step S30. When the trial print is executed so that the print condition for finally carrying out the real print is determined, the OK button 53 is pushed down in a state in which the print condition is set.

At the Step S150, real print data are generated and output on the specified print condition. More specifically, the image data on the real image stored in the RAM 33 are subjected to the color conversion processing, the halftone processing and the microweave processing in accordance with the print condition (including the picture quality condition) determined and set in the trial print, and furthermore, the raster data acquired through these processings are command converted to generate print data, and the print data thus generated are output to the printer 20 through the input/output interface 35. Thus, the real print is carried out by means of the printer 20, and a real image is printed on a paper having an A2 size, for example.

As described above in detail, according to the embodiment, the following advantages can be produced.

(1) The frame size of the area specifying frame 67 is set in such a manner that the partial image can be trimmed in a size determined from the trial print size (trial paper size) so as to perform a magnification change processing having an equal magnification to a magnification at which an image is changed to the print size determined from the print size condition in the real print. If the region (partial image) specified by the area specifying frame 67 is subjected to the trial print, therefore, it is possible to obtain the print data on the partial image printed at an equal magnification to that in the real print. If the magnification is equal to that in the real print, a resolution obtained after the magnification change processing for a partial image is almost equal to that in the real print. Therefore, the other processing conditions of the image processing such as smoothing to be carried out later are almost the same for the trial print and the real print so that the trial print image has a print picture quality which accurately reflects the real print picture quality. The reason is that the processing conditions of the image processing such as the smoothing tend to depend on the image resolution of an image to be a processing object. By seeing the print picture quality of the trial print image, it is possible to determine suitable picture quality conditions for the real print (a print resolution, a gamma and an intent).

(2) The trial print having the same print picture quality as that in the real print can be carried out on a paper (a standard-size paper) having a smaller trial paper size than a paper size used in the real print. Therefore, it is possible to determine the print condition (particularly, the picture quality condition) of the real print by carrying out the trial print on a small paper to partially confirm the print picture quality. Accordingly, it is possible to save a tine required for the trial print and to suppress the consumption and an expensive large-size photographic paper and ink in a large amount as compared with a conventional method of carrying out the trial print over a large size photographic paper to be used in the real print.

(3) If the paper size is specified in the pull-down menu 63, the area specifying frame 67 for specifying the trial print region is displayed in the frame size adjusted to the trial paper size on the preview image 62. Therefore, it is possible to select a partial image by a comparatively simple input operation for simply changing the position of the area specifying frame 67. Moreover, it is possible to carry out the trial print in a proper print size adjusted to the paper size.

(4) The area specifying fame 67 is displayed in such a frame size that the ratio of the frame size to the preview image size is coincident with the ratio of the trial print size to the real print size (=trial print size/real print size). It is possible to avoid such a situation that a partial image is printed with excessive protrusion from the trial paper or the partial image is too small as compared with the trial paper size. In the case in which the trial print is carried out over the paper with a margin, for example, it is possible to avoid such a situation that the print is not performed though the paper enters the area specifying frame 67.

(5) The area specifying frame 67 is displayed in such a frame size that the ratio of the frame size to the preview image size is coincident with the ratio of the trial paper size to the real print size (=trial paper size/real print size). If the region is specified by the area specifying frame 67, therefore, it is possible to easily specify a partial image which can be trial printed on the paper without a four-side margin. Accordingly, the partial image can be printed without the four-side margin over the paper. Moreover, the frame size is determined by the trial print size in place of a larger print area in the print without the four-side margin than the paper. If the paper enters the area specifying frame 67, therefore, the print is carried out almost reliably. In other words, it is possible to avoid such a situation that the print cannot be carried out within the area specifying frame 67 which might be caused when the frame size is determined from the trial print size.

(6) It is possible to select a desirable trial paper size in the pull-down menu 63 to be the trial paper size input means. If a partial region of the preview image is specified by the area specifying frame 67 displayed in a frame size corresponding to the desirable trial paper size, accordingly, it is possible to carry out the print by setting, as a partial image, a region having a size adjusted to the trial paper size.

(7) In the case in which the "four-side rimless print" is specified, the real print size is demanded to be a larger size protruded from four sides than the paper size, and furthermore, the trial print size is also demanded to be a larger size protruded from the four sides than the trial paper size. For the preview image size, the area specifying frame 67 is displayed in a size corresponding to the ratio of the trial paper size/print size. Therefore, the area specifying frame 67 is displayed in the frame size capable of carrying out a rimless print over the trial paper size. By using the area specifying frame 67, consequently, it is possible to easily specify the region having such a size as to enable the rimless print over the trial paper size.

(8) If a numeral is input and specified in the pull-down menu 64 to be numeral input means, the same number of area specifying frames 67 as the specified number are displayed. Therefore, it is possible to specify a plurality of different partial images for one image. By one print executing operation, therefore, it is possible to print the different partial-images in one image at a time.

(9) If the keyword is selected and specified in the pull-down menu 65 to be keyword input means, a predetermined image analysis processing corresponding to the specified keyword is carried out over image data, a specific position on an image is obtained from a result of the analysis of the image analysis processing, and the area specifying frame 67 is displayed in a position on the preview image 62 corresponding to the specific position. Thus, the area specifying frame 67 is displayed in a desirable position specified by the keyword. Therefore, a subsequent operation for changing the position of the area specifying frame 67 can be caused to be unnecessary or to be such a simple operation as to slightly change the position. Accordingly, the trial printing operation can easily be carried out.

(10) If the "Face" is specified to be input as the keyword, the face recognition processing corresponding to the keyword of the "Face" is carried out over image data and the area specifying frame 67 is displayed in a position on the preview image 62 which corresponds to a specific position on the image determined from the result of the recognition of a face recognition processing. Thus, the area specifying frame 67 is displayed in a position of a face representing a place to be confirmed by the trial print. Therefore, the subsequent operation for changing the position of the area specifying frame 67 can be caused to be unnecessary or to be such a simple operation as to slightly change the position. Accordingly, the trial printing operation can easily be carried out.

(11) If the "Highlight" or "Shadow" to be the color related keyword is specified to be input as the keyword, the color analysis processing corresponding to the color related keyword is carried out over image data, a position in which a predetermined color specified by the color related keyword is distributed is obtained by the color analysis processing, and the area specifying frame 67 is displayed in a position on the preview image 62 corresponding to a specific position on an image determined from a result of the color analysis processing. For example, if the color related keyword related to a color of Sky, Sea, Leaf or Skin is specified, the area specifying frame 67 is displayed in a position of the Sky (blue), the Sea (blue), the Leaf (green) or the Skin (skin color) which represents a place in which a color is to be confirmed by the trial print. Therefore, the subsequent operation for changing the position of the area specifying frame 67 can be caused to be unnecessary or to be such a simple operation as to slightly change the position. Accordingly, the trial printing operation can easily be carried out.

(12) If the "Highlight" or "Shadow" to be the brightness related keyword is specified to be input as the keyword, the brightness analysis processing corresponding to the brightness related keyword is carried out over image data, a position in which a predetermined brightness specified by the brightness related keyword is distributed is obtained by the brightness analysis processing. The area specifying frame 67 is displayed in a position on the preview image 62 corresponding to a specific position on an image determined from a result of the brightness analysis processing. For example, if the keyword related to a brightness such as the Shadow or the Highlight is specified, the area specifying frame 67 is displayed in a position of the Shadow or the Highlight which represents a place in which a brightness is to be confirmed by the trial print. Therefore, the subsequent operation for changing the position of the area specifying frame 67 can be caused to be unnecessary or to be such a simple operation as to slightly change the position. Accordingly, the trial printing operation can easily be carried out.

(13) A predetermined picture quality condition in the applied print conditions is printed as the text portion 69b together with the print image 69a on a print medium (paper) on which a partial image is printed. By seeing a partial print image, therefore, it is possible to grasp the print picture quality and the applied picture quality condition correspondingly. By seeing a print paper having an optimum print picture quality, it is possible to know an optimum picture quality condition.

(14) When an image to be a print object is specified by incorporating a trial print processing program into the printer driver program, the basic setting screen 40 to be displayed for the real print is displayed on the monitor 12. When the trial print tab 44 on the print setting screen is operated by the input means, furthermore, a trial print setting screen having the trial print button 68 to be a trial print executing portion is displayed. It is possible to open the trial print setting screen 60, thereby carrying out the trial print over the basic setting screen 40 for the real print if necessary.

(15) When the trial print setting screen 60 is once opened to operate input means from the trial print setting screen 60 set to be trial printable and the basic setting screen 40A is thus returned, the trial print button 68 (the trial print executing portion) is added to the basic setting screen 40A thus returned. Therefore, it is possible to operate the trial print button 68, thereby executing the trial print from the basic setting screen 40A for the real print.

(16) Even if the trial print based on the print data generated by operating the trial print button 68, the display of the trial print setting screen 60 or the basic setting screen 40A in the operation of the trial print button 68 is maintained, and furthermore, the display of the trial print button 68 in the screen is also maintained. By subsequently carrying out the trial print or operating the OK button 53 from the screen having the display maintained, therefore, it is possible to execute the real print.

(17) By operating the OK button 53 (the real print executing operation) from the trial print setting screen 60, it is possible to execute the real print.

Second Embodiment

Next, a second embodiment will be described with reference to FIGS. 9 to 12. In the second embodiment, a trial print setting screen is different from that in the first embodiment. Since the other structures are the same as those in the first embodiment, only different points will be particularly described in detail.

Figure 9:
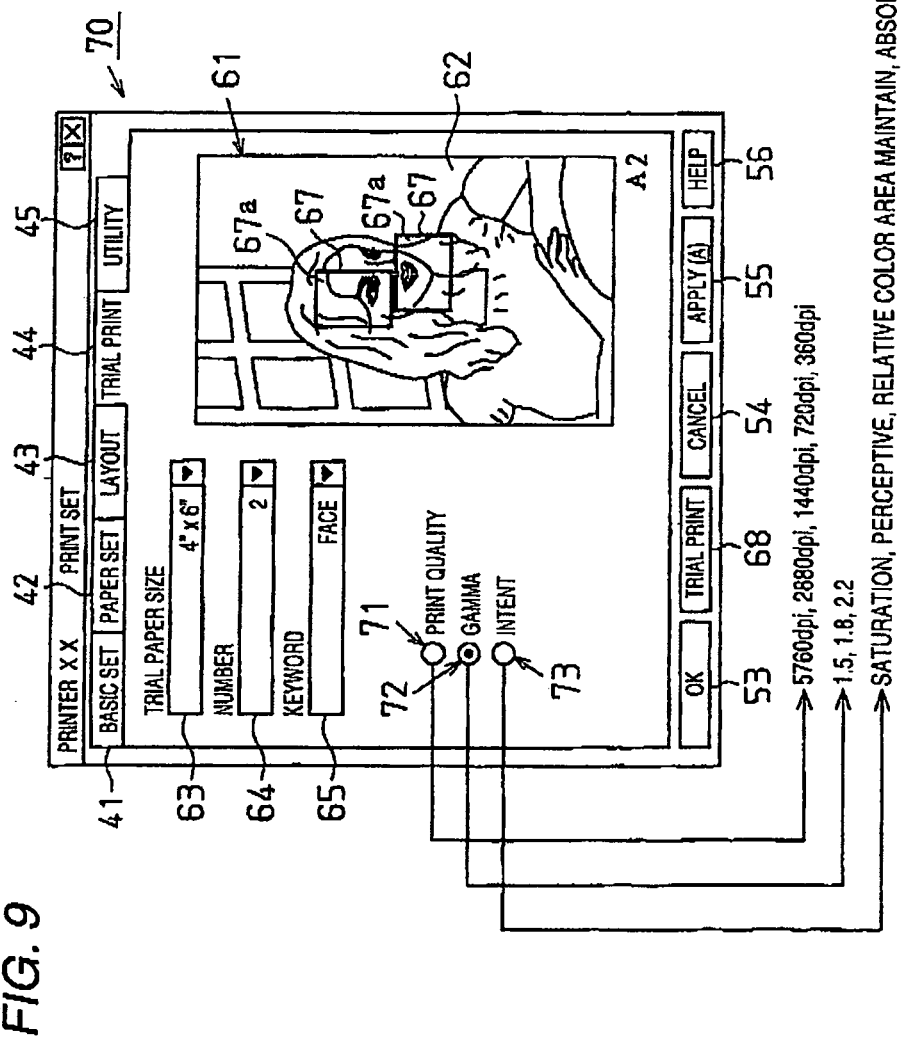
FIG. 9 is a typical view showing a trial print setting screen according to a second embodiment.

FIG. 9 shows a trial print setting screen 70 according to the embodiment. As shown in FIG. 9, three radio buttons 71, 72 and 73 capable of selecting typical picture quality conditions for setting a trial print are provided on a lower side of pull-down menus 63 to 65 on the trial print setting screen 70. More specifically, the radio button 71 can select a print quality, the radio button 72 can select a gamma and the radio button 73 can select an intent. When the radio button is selected, the trial print can be carried out for all parameters related to the picture quality condition thus selected.

As shown in FIG. 9, when the radio button 71 for "Print quality" is selected, all of parameters related to the print quality, that is, "5760 dpi", "2880 dpi", "1440 dpi", "720 dpi" and "360 dpi" which are indicated in an arrow on the lower side of the trial print setting screen 70 are selected and set in FIG. 9. As a matter of course, as a printing method, it is also possible to employ a structure in which "5760 dpi" and "2880 dpi" are set as all parameters corresponding to a photographic print, for example, in a printer driver which can originally select only a high resolution.

When the radio button 72 of "Gamma" is selected, moreover, all of parameters related to the gamma, that is, "1.5", "1.8" and "2.2" which are indicated in an arrow on the lower side of the trial print setting screen 70 are selected and set in FIG. 9. When the radio button 73 of "Intent" is selected, furthermore, all of parameters related to the intent, that is, "Saturation", "Perceptive", "Relative color area maintain" and "Absolute color area maintain" which are indicated in an arrow on the lower side of the trial print setting screen 70 are selected and set in FIG. 9.

Figure 10:
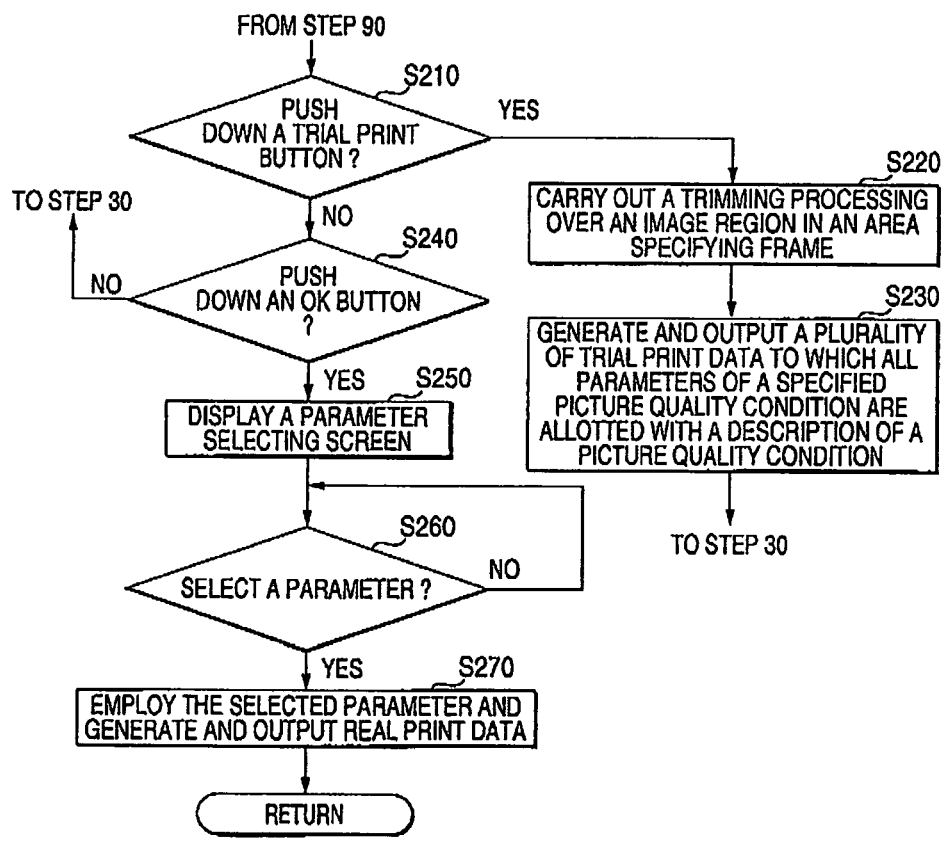
FIG. 10 is a flowchart showing a trial print processing routine.

FIG. 10 is a flowchart showing a trial print processing according to the embodiment. A trial print processing according to the embodiment will be described below with reference to FIG. 10. Since processings of Steps S10 to S90 are the same as those in the first embodiment, a next step to the Step S90 will be first described. More specifically, if "No" is obtained at the Step S90, the processing proceeds to Step S210. In the trial print setting screen 70, the picture quality condition is selected from the radio buttons 71 to 73 in addition to the setting in the first embodiment. For example, the radio button 71 is selected in the case in which the parameter of the "Print quality" is to be allotted, the radio button 72 is selected in the case in which the parameter of the "Gamma" is to be allotted, and the radio button 73 is selected in the case in which the parameter of the "Intent" is to be allotted. In the case in which the radio button 72 of the "Gamma" is selected, the condition of "Manual color correct" to be a precondition for setting a gamma value is set. On the other hand, in the case in which the radio button 73 of the "Intent" is selected, the condition of "ICM" to be a precondition for setting an intent is set. All of the three radio buttons 71 to 73 can also be selected. Referring to the items which are not selected, the print condition of the real print set on the other screen such as a basic setting screen 40 is employed. For example, it is assumed that the radio button 72 of the "Gamma" is selected as shown in FIG. 9.

At Step S210, it is decided whether the trial print button 68 is pushed down or not. If the trial print button 68 is pushed down, the processing proceeds to Step S220. If the trial print button 68 is not pushed down, the processing proceeds to Step S240.

At the Step S220, an image region in an area specifying frame 67 is subjected to a trimming processing. This is the same as the processing at the Step S120 in the first embodiment.

At next Step S230, a plurality of trial print data to which all of the parameters of the specified image condition are allotted are generated with a description of a picture quality condition and are output. For instance, the "Gamma" is selected as a picture quality condition by the radio button 72 in the example of FIG. 9. Therefore, there are generated three print data to which all of the parameters of the "Gamma", that is, "1.5", "1.8" and "2.2" are allotted. Referring to the items which are not selected by the radio button, the setting condition of the real print is employed. In the example, the print quality set to the real print, that is, "2880 dpi" is employed. The "Intent" is a picture quality condition which is independent of the "Gamma". In the case in which the radio button 73 of the "Intent" is further selected, therefore, it is possible to obtain seven print images in total by adding three print images to which the parameter of the gamma is allotted and four print images to which the parameter of the intent is allotted.

Figure 12:
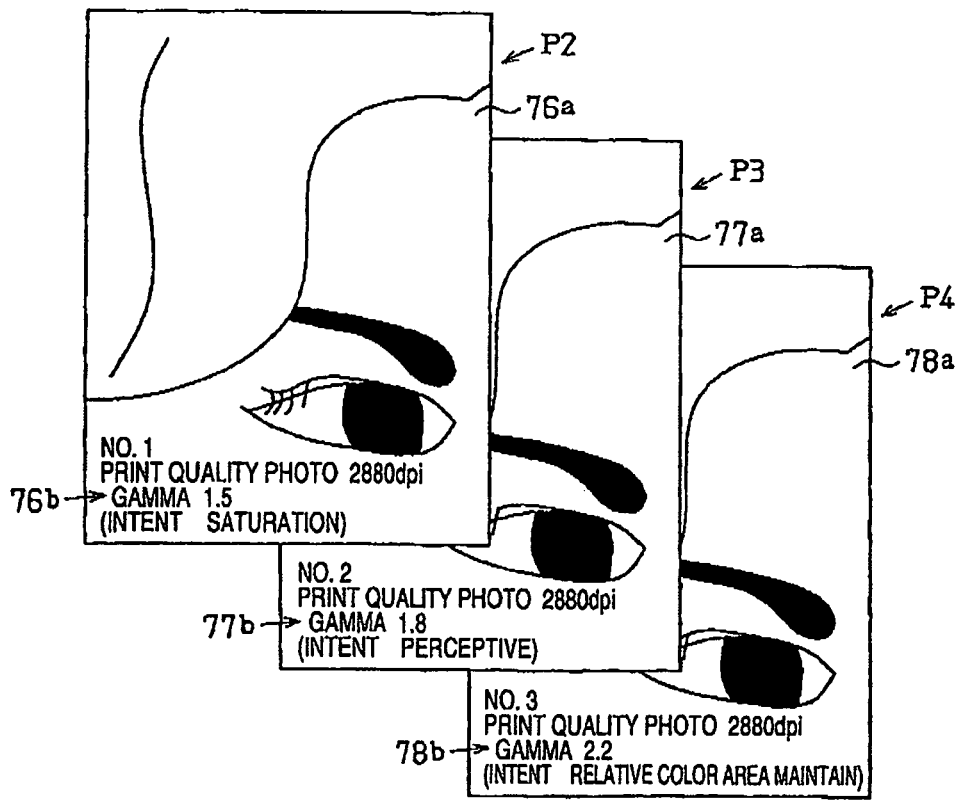
FIG. 12 is a typical view showing a print photograph which is trial printed by allotting a parameter of a picture quality condition.

In detail, for the trimming image, a color conversion processing is carried out on a print condition that only the parameters of the "Gamma", that is, "1.5", "1.8" and "2.2" are allotted on the same print condition as that of the real print including the print quality of "2880 dpi", a halftone processing and a microweave processing are further carried out for data subjected to the color conversion processing, and a command conversion processing is carried out over raster data for a print which are obtained, thereby generating print data (PRN data). Thus, the print data are output to a printer 20 through an input/output interface 35. As shown in FIG. 12, thus, three print photographs P2, P3 and P4 for a trial print to which the parameter of the "Gamma" is allotted are printed. The print photographs P2, P3 and P4 are constituted by print images 76a, 77a and 78a corresponding to partial images specified by an area specifying frame 67 and text portions 76b, 77b and 78b in which the picture quality condition is printed in lower parts, respectively. By seeing the print picture qualities of the three print photographs P2, P3 and P4 to which the parameter of the gamma is allotted, an optimum gamma parameter is determined as the print condition of the real print. In FIG. 12, a print example is shown in a parenthesis in the case in which the intent is selected in the text portions 76b, 77b and 78b (only three of the intent parameters).

At Step S240, it is decided whether the OK button 53 is pushed down or not. If the OK button 53 is pushed down, the processing proceeds to Step S250. If the OK button 53 is not pushed down, the processing returns to Step S30.

Figure 11:
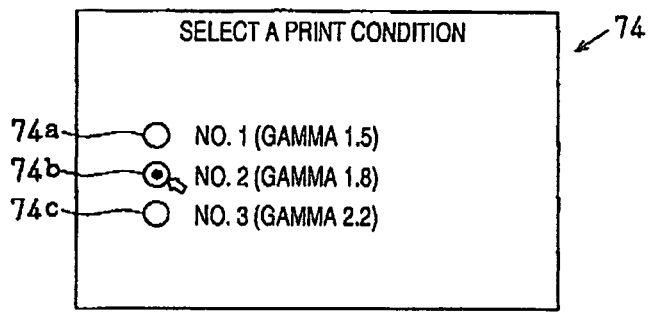
FIG. 11 is a view showing a parameter selecting screen.

At Step S250, a parameter selecting screen is displayed. FIG. 11 shows the parameter selecting screen. A parameter selecting screen 74 serves to select a parameter to be selected as a real print from the parameters of the picture quality conditions selected from the radio buttons 71 to 73. In the example in which the radio button 72 of the gamma is selected, the same number of (three in the example) radio buttons 74a, 74b and 74c as the number of the parameters which can select the parameter of the gamma are displayed and a desirable number (a gamma value) is selected from the radio button. In the example of FIG. 11, the radio button 74b of a number corresponding to the gamma of "1.8" is selected. Although the parameter selecting screen 74 can select the radio button in a photographic print number, it is also possible to employ a structure in which the radio button is displayed for each parameter to select a desirable parameter for each parameter. According to the embodiment in which the radio button can be selected in the photographic print number, also in the case in which a plurality of parameters of the print picture quality, the gamma and the intent are allotted, it is possible to set each parameter related to a plurality of picture quality conditions at a time by simply selecting one of the radio buttons corresponding to the photographic print number. Therefore, it is possible to easily carry out an operation for setting the parameter. A CPU 31 stores a relationship of a combination of the photographic print number and each parameter in a predetermined region of an RAM 33.

In the case in which the radio button 71 for a print quality is selected to carry out a trial print allotting a parameter of the print quality, a plurality of radio buttons capable of selecting a desirable print quality is displayed on the parameter selecting screen 74 and the desirable print quality is selected from them. In the case in which the radio button 73 of the intent is selected to carry out the trial print, similarly, a plurality of radio buttons capable of selecting a desirable intent is displayed on the parameter selecting screen 74 and the desirable intent is selected from them. For example, in the case in which all of the radio buttons 71 to 73 are selected to carry out the trial print, the radio buttons of "Print quality", "Gamma" and "Intent" are displayed corresponding to the number of the respective parameters on the parameter selecting screen 74.

When the radio button of a desirable parameter is selected in the parameter selecting screen 74, the parameter thus selected is employed to generate and output print data on the real print. When the OK button 53 is pushed down, thus, the parameter selecting screen 74 is displayed. Therefore, it is preferable to specify the photographic print number of the trial print with the radio button without resetting, in the basic setting screen, the desirable picture quality condition determined by seeing the trial print, for example. Therefore, it is possible to easily carry out an operation for setting the condition of the real print after the trial print.

(18) All of parameters preset to the specified picture quality condition which is selected and input are allotted to the radio buttons 71 to 73 to be picture quality condition input means and an image processing based on the picture quality condition is thus carried out, thereby generating print data capable of printing a plurality of partial images having the parameters of the specified picture quality condition allotted thereto. In the case in which the parameter of the picture quality condition is allotted to trial print the partial images, therefore, the partial images to which the parameter of the specified picture quality condition is allotted are printed by one print executing operation Consequently, it is possible to omit a great deal of time and labor for printing the partial images for each parameter plural times.

(19) When the OK button 53 to be a real print executing portion is pushed down to give an instruction for executing the real print, the parameter selecting screen 74 is displayed. In the case in which the parameter is allotted to carry out the trial print, therefore, it is possible to easily set the picture quality condition by inputting the photographic print number in the text portion of a plurality of trial print photographs. For this reason, it is not necessary to open the setting screen and to input and set the parameters one by one.

Third Embodiment

Next, a third embodiment will be described with reference to FIGS. 13 to 15. In the third embodiment, a trial print setting screen is different from that in the first embodiment. Since the other structures are almost the same as those in the first embodiment, only different points will be particularly described in detail.

Figure 13:
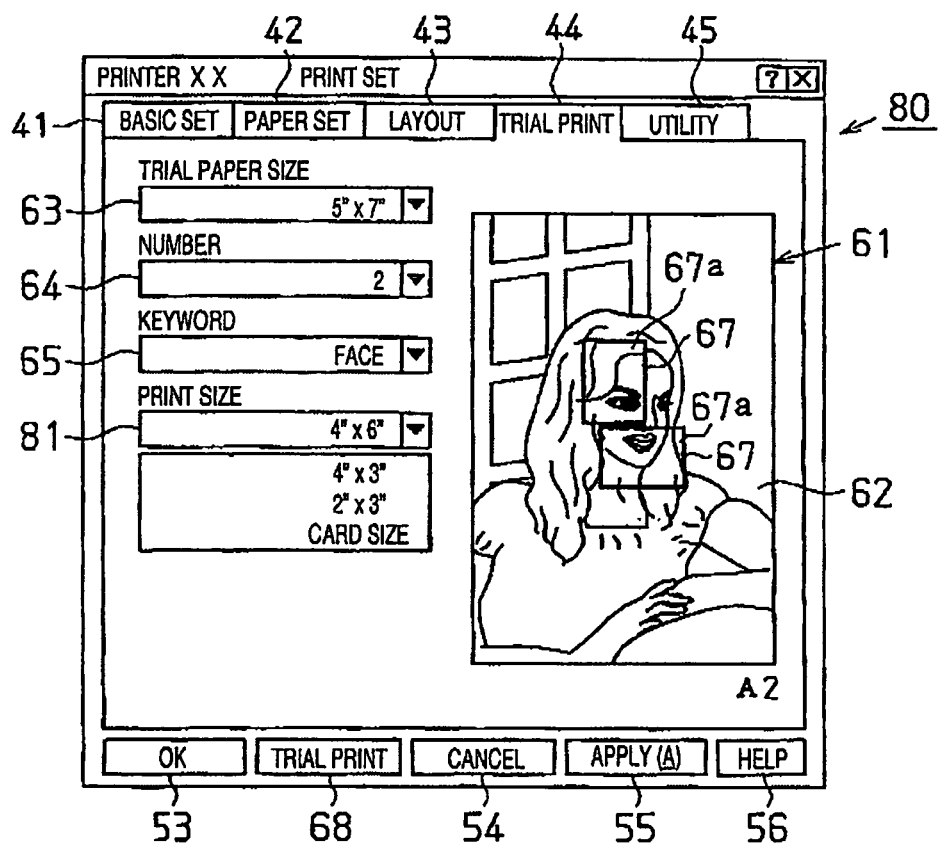
FIG. 13 is a typical view showing a trial print setting screen according to a third embodiment.

FIG. 13 shows a trial print setting screen 70 according to the embodiment. As shown in FIG. 13, a pull-down menu 81 capable of selecting a print size of a trial print is provided on a lower side of pull-down menus 63 to 65 in a trial print setting screen 80. More specifically, it is possible to select the print size from an "4"×6" size", an "4"×3" size", an "2"×3" size" and a "card size". For example, when the print size is selected to be the "4"×6" size" in a state in which a "5"×7" size" is selected as a trial paper size, two partial images having the 4"×6" print size are printed on a paper having the 5"×7" size. More specifically, an N-up print is carried out in a number of "N" indicated by the trial paper size/print size (which is rounded off to the nearest decimal point). In the case in which aspect ratios of the trial print size and the print size are different from each other, the maximum number of partial images having the print size which can be disposed on a paper having the trial paper size are printed.

Figure 14:
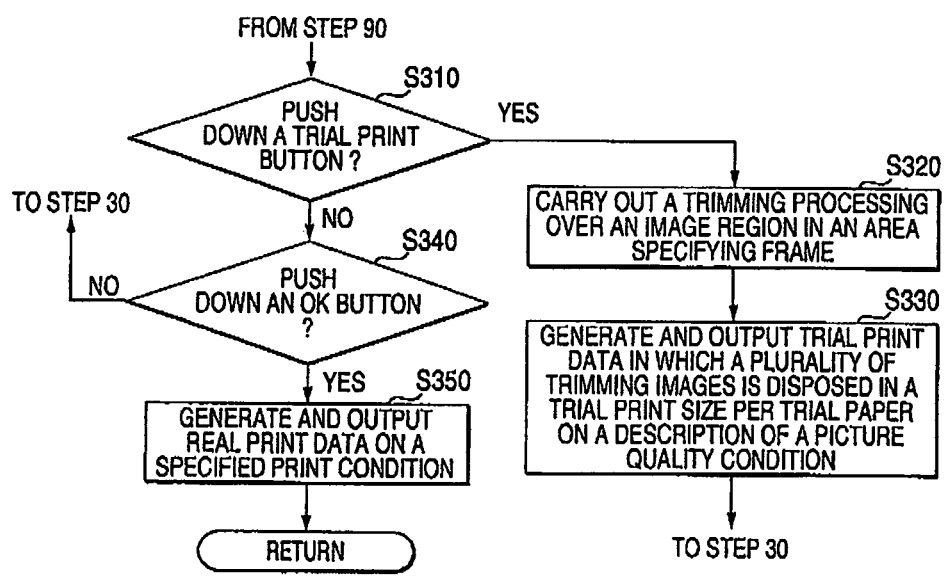
FIG. 14 is a flowchart showing a trial print processing routine.

FIG. 14 is a flowchart showing a trial print processing according to the embodiment. The trial print processing according to the embodiment sill be described with reference to FIG. 14. Processings of Steps S10 to S90 are almost the same as those in the first embodiment.

In a processing of displaying an area specifying frame 67 at the Step S40, a determination is carried out based on the print size and the following processing is carried out. A length "X" in an X direction and a length "Y" in a Y direction of a frame area FlameArea are expressed in the equations (3) and (4), wherein dimensions in the X and Y directions of the trial print size (for example, the 4"×6" size) are represented as Xtrialprint and Ytrialprint. The area specifying frame 67 is displayed in a frame size determined by the equations (3) and (4). A position of the area specifying frame 67 is obtained by a calculation through the same processing procedure as that in the first embodiment. More specifically, the area specifying frame 67 is displayed on a preview image 62 in a size adjusted to the print size.

Since the other processings to be carried out before the Step S90 are the same as those in the first embodiment, a next step to the Step S90 will be first described. More specifically, if "NO" is obtained at the Step S90, the processing proceeds to Step S310. In the trial print setting screen 80, "Print size" is selected in the pull-down menu 81 in addition to the setting in the first embodiment. For example, it is assumed that the "4"×6" size" is selected as the print size.

At Step S310, it is decided whether the trial print button 68 is pushed down or not. If the trial print button 68 is pushed down, the processing proceeds to Step S320. If the trial print button 68 is not pushed down, the processing proceeds to Step S340.

At the Step S320, an image region in an area specifying frame 67 is subjected to a trimming processing. This is the same as the processing at the Step S120 in the first embodiment.

At next Step S330, trial print data in which a plurality of trimming images is disposed in a trial print size per print paper are generated with a description of a picture quality condition and are output. More specifically, a text portion with a description of a picture quality condition is synthesized with a trimming image obtained by cutting out a region corresponding to a region specified by the area specifying frame 67 from image data, and a layout processing in which N trimming images (partial images) are disposed per trial paper is then carried out. Thereafter, an enlargement processing is carried out at an equal magnification to that in a real print over the image data subjected to the layout processing. A color conversion processing, a halftone processing and a microweave processing are sequentially carried out over image data obtained by the enlargement processing, and furthermore, a command conversion processing is carried out to generate print data capable of carrying out an N-up print in which N partial images specified by the area specifying frame 67 are disposed in one trial paper and to output them to a printer 20 through an input/output interface 35. Thus, the printer 20 carries out a print processing based on data received from a host computer 10, thereby outputting a print photograph P5 shown in FIG. 15 in which the partial image specified by the area specifying frame 67 is N-up printed on one trial paper.

Figure 15:
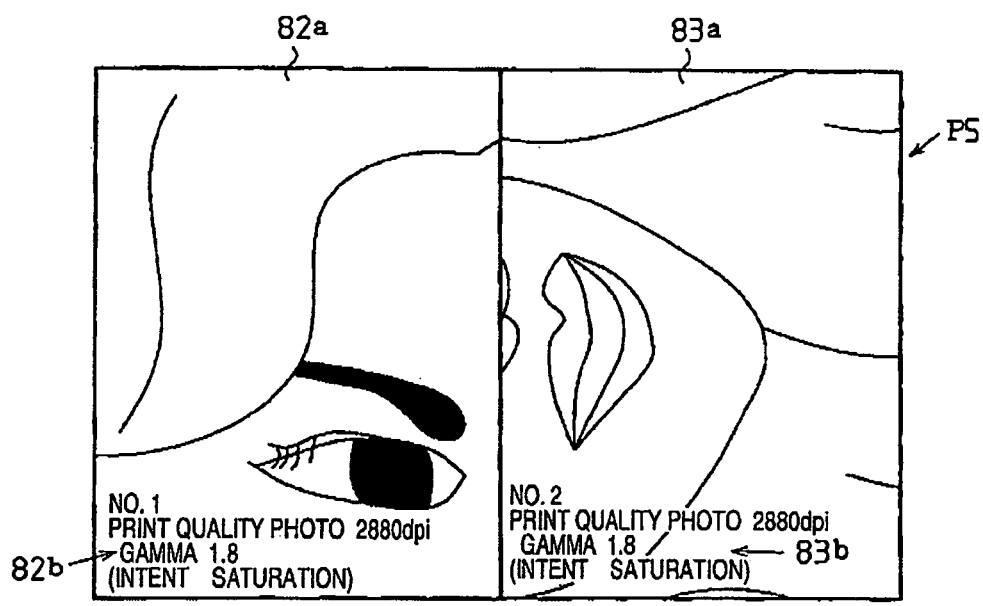
FIG. 15 is a typical view showing a print photograph.

As shown in FIG. 15, print images 82a and 83a corresponding to the partial images specified by the area specifying frames 67 are N-up printed (2-up in the example) in the print photograph P5, and text portions 82b and 83b with a description of respective picture quality conditions are printed in the lower parts of the print images 82a and 83a. Thus, a plurality of partial images can be up-printed on one paper for a trial print. As compared with each of the embodiments, therefore, it is possible to save papers more greatly and to execute the trial print more efficiently.

(20) The trial paper size and the trial print size are input through the pull-down menus 63 and 81 respectively, and the area specifying frame 67 is displayed in such a frame size that a ratio of the frame size to a preview image size is equal to a ratio of a trial print size to a print size of a real print (=trial print size/real print size). If a trial print size which is equal to or smaller than a half of the trial paper size is selected and specified, there are generated print data capable of carrying out a plural-up print in which a plurality of partial images is disposed on a paper having the trial paper size. By carrying out the plural-up print in which a plurality of partial images is disposed on one trial paper, accordingly, it is possible to farther save a paper and ink.

Fourth Embodiment

Next, a fourth embodiment will be described with reference to FIG. 16. In the fourth embodiment, a trial print setting screen is different from that in the first embodiment. Since the other structures are almost the same as those in the first embodiment, only different points will be particularly described in detail.

Figure 16:
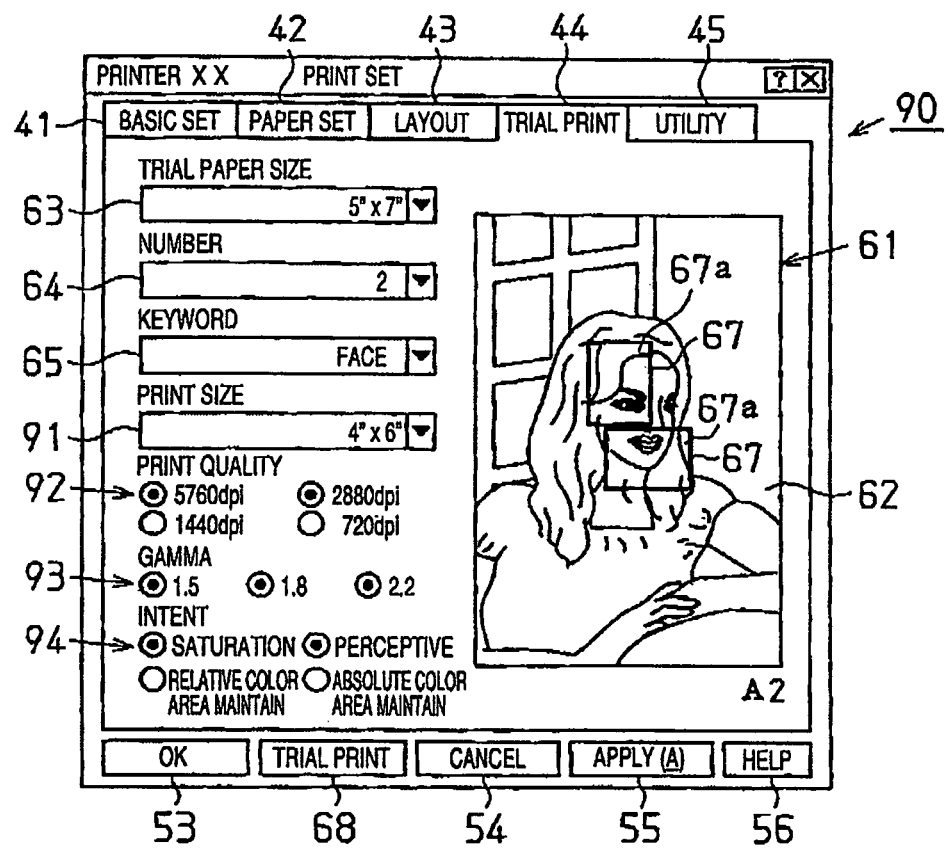
FIG. 16 is a typical view showing a trial print setting screen according to a fourth embodiment.

FIG. 16 shows a trial print setting screen according to the embodiment. As shown in FIG. 16, a trial print setting screen 90 is provided with a pull-down menu 91 capable of selecting the same trial print size as that of the third embodiment. By selecting the pull-down menu 91, it is possible to select one of an "4"×6" size", an "4"×3"" size", an "2"×3" size" and a "card size" as a print size. Furthermore, there are provided radio buttons 92, 93 and 94 capable of specifying parameters of the same picture quality condition as that of the second embodiment. In the embodiment, the parameters of the picture quality condition can be selected individually. More specifically, the radio button 92 serves to select "Print quality" and a plurality of (four for a photographic print in the example) qualities corresponding to the respective parameters is provided. Moreover, the radio button 93 serves to select "Gamma" and a plurality of (three in the example) gammas corresponding to the respective parameters is provided. The radio button 94 serves to select "Intent" and a plurality of (four in the example) intents corresponding to the respective parameters is provided. There is selected any of the three radio buttons 92, 93 and 94 for each picture quality condition which is employed as the parameter and corresponds to the parameter to be trial printed.

For instance, in the example shown in FIG. 16, two radio buttons 92, that is, "5760 dpi" and "2880 dpi" are selected as the "Print quality". Moreover, all of the three radio buttons 93, that is, "1.5", "1.8" and "2.2" are selected as the "Gamma". Furthermore, the two radio buttons 94, that is, "Saturation" and "Perceptive" are selected as the "Intent".

When the trial print button 68 is pushed down with the set contents, partial images specified by a plurality of (two in the example) area specifying frames 67 having a frame size corresponding to a print size are cut out as trimming images, and print data are generated on ten picture quality conditions (two "Print qualities" X (three "Gammas"+two "Intents") for the respective trimming images. In detail, two trimming images are subjected to a layout processing in such a manner as to obtain a layout in which two trimming images are disposed per paper having a trial paper size and a 2-up print can be carried out. For image data subjected to the layout processing, on the print condition that ten picture quality conditions are allotted, the picture quality condition (the print condition) is changed every time to carry out a series of image processings including a color conversion processing, a halftone processing and a microweave processing ten times, thereby generating raster data for a print corresponding to ten sheets, and furthermore, a command conversion processing is carried out to generate print data. The print data thus generated are output to a printer 20 through an input/output interface 35.

The printer 20 outputs ten print photographs in which two partial images are 2-up printed on 10 image conditions. Thus, a plurality of partial images specified by the area specifying frame 67 can be up-printed on one trial paper, and furthermore, desirable parameters can be individually selected and specified from a plurality of parameters for an image condition. Therefore, it is possible to suppress the wasteful consumption of a photographic print paper and ink still more, thereby carrying out a print efficiently.

The embodiments of the invention are not restricted to the foregoing but may be changed in the following manner.

(First Variant) While the area specifying frame 67 is displayed in a frame size in which such a partial image as to be coincident with a trial print size can be specified when a magnification change processing is carried out at an equal magnification to that in a real print in the embodiments, the frame size of the area specifying frame can also be optional. For example, in the case in which a partial image specified in a predetermined frame size is selected or a frame size is changed by a manual operation to select a partial image, a magnification of a magnification change processing for the partial image is set to be equal to a magnification determined by the print size condition of the real print. Consequently, there is a possibility that a margin might be increased as compared with each of the embodiments. However, it is possible to carry out a trial print of an equivalent print picture quality to that in the real print.

(Second Variant) While the area specifying frame to be a region is moved by the input operation of the input device, it is also possible to employ a structure in which a region specified by an input keyword (a region of a face, a specific color or a specific brightness) is detected by an image analysis processing, the area specifying frame is set into a position corresponding to the specific region, and a cut-out region of an image is decided without permitting the movement caused by the input operation of the input device.

(Third Variant) It is also possible to employ a structure in which a user regulates a frame size of an area specifying frame (a trimming frame) through an operation of a mouse. It is slightly hard to print a partial image in a print size adapted to a trial paper size. By carrying out a magnification change processing at a magnification determined by the print size condition of a real print, however, it is possible to appropriately decide a print picture quality.

(Fourth Variant) While the trial print size has been employed as the trial print size information for determining the number of up-prints in the third and fourth embodiments, it is also possible to input, as the trial print size information, the "number (the number of up-prints)" at which a plurality of partial images is printed on one paper. In this case, it is assumed that a size obtained by equally dividing the trial paper size by the number of up-prints is set to be a print size and an area specifying frame having a size corresponding to the print size is displayed on a preview image. In the third and fourth embodiments, there has been employed a structure in which the frame is specified in the print size. For this reason, four print images having the 4"×6" size or eight print images having a half of the 4"×6" size (4"×3") are printed on a paper having an A4 size, for example. In this case, a margin is formed. On the other hand, in a method according to the variant, a partial image having a size obtained by dividing a paper having an A4 size into N equal parts can be printed on N papers having the A4 size without a blank through a rimless print (N up-prints), for example. In addition, it is also possible to set the number of N to be an optional value (for example, six) other than four and eight.

(Fifth Variant) While there has been employed the structure in which the trial paper size can be input and specified in the embodiments, it is also possible to use one fixed value which is predetermined in a default. For a fixed value of a trial paper size, an 4"×6" size or a 5"×7" size (a size of a predetermined paper having a standard size) is preferable, for example. According to the structure, it is possible to carry out a trial print without performing an operation for setting a paper size. Referring to the print size in the fourth embodiment, similarly, it is also possible to set one fixed value determined in a default in place of the structure in which the size can be input and specified. For a fixed value of the print size, the 4"×6" size is preferable. According to the structure, it is possible to carry out a plural-up trial print without executing the operation for setting the print size.

(Sixth Variant) In the third and fourth embodiments, all of the area specifying frames which are displayed on the preview image are set to have an equal size and all of the print sizes of the partial images to be up-printed are set to be equal. On the other hand, it is possible to employ a structure in which area specifying frames having different sizes can be displayed and the sizes of the area specifying frames can be changed by an input operation of input means and a structure in which partial images having different sizes specified by the area specifying frames having the different sizes are disposed and printed on one paper.

(Seventh Variant) While there has been employed the structure in which the trial print processing program is incorporated into the printer driver program in each of the embodiments, the same program can also be constituted as another program. For example, the program may be an attached software to be included in the same CD as the printer driver. Moreover, it is also possible to employ a structure in which the trial print processing program is not incorporated into the printer driver but is constituted as a special application for a trial print, and furthermore, a structure in which the trial print processing program is incorporated into a drawing application program.

(Eighth Variant) While the print condition input means (the pull-down menu and the radio button) of the print conditions for the trial print and the preview image are displayed on the same screen by setting one trial print setting screen in the embodiments, it is also possible to employ a structure in which a plurality of trial print setting screens is prepared and the print condition input means and the preview image are displayed on separate screens.

Description will be given to the technical thought grasped from the embodiments and each of the variants.

(1) A printer driver constructed in a host computer having a communicating function capable of communicating with a printer and including an input device and a display device by installing a program in the host computer, comprising preview means for displaying a preview image of an image specified as a print object on the display device in such a state that a partial region in the image can be distinguished, display control means for changing a position of the region displayed on the preview image based on an input from the input device, area specifying means for specifying a partial area of an image corresponding to the region, setting means for setting a print condition including a print size condition for determining a print size and a picture quality condition for determining a print picture quality based on the input from the input device and setting to include at least a print size condition for a real print of the image as the print size condition, and print data generating means for carrying out an image cut-out processing of cutting out a portion corresponding to an area specified by the area specifying means from the image data, thereby acquiring partial image data, a magnification change processing which is defined from the print size condition of the real print and to which an almost equal magnification to a magnification for determining a print size of the real print is set, and an image processing based on the same picture quality condition as the real print or a picture quality condition set separately from the real print in rough order for the partial image data, thereby generating print data on the partial image, the magnification change processing and the image processing being carried out in the same order as the real print in the print data generating means.

(2) The method of generating print data according to claim 17, further comprising a preview step of displaying a preview image of the image specified as a print object on the display device in such a state that a partial region in the image can be distinguished, and a display control step of changing a position of the region displayed on the preview image based on an input from the input device, the region being specified as the area at the area specifying step.

(3) The apparatus for generating print data according to claim 15 or 16, wherein the display control means displays a real print executing portion on the trial print setting screen. Consequently, it is possible to execute the real print by operating the print executing portion over the trial print setting screen.

What is claimed is:

1. A print data generating apparatus comprising:
a designator, operable to designate image data indicative of an image;
a setting provider, operable to provide a print size condition determining a print size of the image and a first image quality condition determining a first print image quality of the image;
a first generator, operable to generate print data indicative of a printed image which is obtained by subjecting the image data to processing corresponding to 1) scaling of the image based on the print size condition, and 2) execution of image processing including a plurality of processes on the image based on the first image quality condition;
a specifier, operable to specify at least one part of the image; and
a second generator, operable to generate trial print data indicative of at least one trial printed image which is obtained by subjecting the image data to processing corresponding to 1) trimming of the part of the image, 2) scaling of the image at the same scale factor with the first generator, and 3) execution of image processing including a plurality of processes on the image based on the first image quality condition,
wherein in the first generator, the scaling of the image based on the print size condition, and the execution of the image processing including the plurality of processes on the image based on the first image quality condition are executed in a predetermined order, and
wherein an order that the scaling and the execution of the image processing including the plurality of processes are executed by the second generator is the same as the predetermined order.

2. The print data generating apparatus as set forth in claim 1, further comprising:
a print section, operable to print at least one of the image and the part of the image based on at least one of the print data generated by the first generator and the trial print data generated by the second generator.

3. The print data generating apparatus as set forth in claim 1, further comprising:
a preview provider, operable to display the image as a preview image on a display such that at least one area on the preview image is displayed in a distinguishable manner; and
a display controller, operable to change a position of the at least one area on the preview image in accordance with a user's input,
wherein the specifier is operable to correspond the at least one area on the preview image to the at least one part of the image.

4. The print data generating apparatus as set forth in claim 3, wherein:
the setting provider is operable to provide a trial print size condition determining a size of the part of the image; and
the area on the preview image is displayed on the display so as to correspond to the size of the part of the image.

5. The print data generating apparatus as set forth in claim 1, further comprising:
a storage that stores a size of a standard-sized available sheet, wherein:
the second generator is operable to generate trial print data indicative of at least one trial printed image which is printed on the standard-sized available sheet based on the size stored on the storage.

6. The print data generating apparatus as set forth in claim 3, wherein:
the display controller is operable to execute an analysis on the image in accordance with a keyword included in the user's input; and
the display controller is operable to display the area on the preview image at a position determined by a result of the analysis.

7. The print data generating apparatus as set forth in claim 6, wherein:
the keyword includes a word "face"; and
the controller is operable to execute a face recognition processing as the analysis in a case where the word "face" is included in the keyword.

8. The print data generating apparatus as set forth in claim 6, wherein:
the key word includes a color-related word; and
the controller is operable to execute analyze a position in which a color specified by the color-related word is distributed as the analysis in a case where the color-related word is included in the keyword.

9. The print data generating apparatus as set forth in claim 6, wherein:
the key word includes a brightness-related word; and
the controller is operable to analyze a position in which a brightness specified by the brightness-related word is distributed as the analysis in a case where the brightness-related word is included in the keyword.

10. The print data generating apparatus as set forth in claim 1, wherein:
the image processing is based on at least one of the first image quality condition and a second image quality condition;
the display controller is operable to display a selection screen requiring to select one of the first image quality condition and the second image quality condition in a case where the second generator generates one of the trial print data based on the first image quality condition and the other one of the trial print data based on the second image quality condition, and an instruction causing the first generator to generate the print data is then received; and
the first generator is operable to generate the print data by executing the image processing based on the second image quality condition, in a case where the second image quality condition is selected.

11. The print data generating apparatus as set forth in claim 1, wherein:
the second generator is operable to generate the trial print data so as to include a text indicative of at least the first image quality condition.

12. The print data generating apparatus as set forth in claim 3, wherein:
the display controller is operable to display at least one of a first screen for causing the first generator to generate the print data and a second screen for causing the second generator to generate the trial print data.

13. The print data generating apparatus as set forth in claim 12, wherein:
the display controller is operable to display at least one of the first screen and the second screen after the second generator generates the trial print data.

14. A method for generating print data indicative of a printed image which is obtained by subjecting image data which is indicative of an image to processing corresponding to 1) scaling of the image based on a print size condition determining a print size of the image, and 2) execution of image processing including a plurality of processes on the image based on a first image quality condition determining a first print image quality of the image, the method comprising:

designating the image data;

setting the print size condition and the first image quality condition;

specifying at least one part of the image; and generating trial print data indicative of at least one trial printed image which is obtained by subjecting the image data to processing corresponding to 1) trimming of the part of the image, 2) scaling of the image at the scale factor of the image based on the print size condition, and 3) execution of image processing including a plurality of processes on the image based on the first image quality condition, wherein in the generating of the print data, the scaling of the image based on the print size condition, and the execution of the image processing including the plurality of processes in the image processing on the image based on the first image quality condition are executed in a predetermined order, and wherein an order that the scaling and the plurality of processes in the image processing are executed in the generating of the trial print data is the same as the predetermined order.

15. A tangible storage medium storing a program causing a computer to execute the method as set forth in claim 14.

16. A print data generating apparatus comprising:

a designator, operable to designate an image;

a setting specifier, operable to specify a print size condition determining a print size of the image and a first image quality condition determining a print quality of the image;

a first generator, operable to generate a print image which is obtained by process corresponding to 1) scaling of the image based on the print size condition, and 2) execution of image processing including a plurality of processes on the image based on the first image quality condition;

a part specifier, operable to specify at least one part of the image; and a second generator, operable to generate a trial print image which is obtained by process corresponding to 1) trimming of the specified part of the image, 2) scaling of the image at the same scale factor with the first generator, and 3) execution of image processing including a plurality of processes on the image based on the first image quality condition, wherein in the first generator, the scaling of the image based on the print size condition, and the execution of the image processing including the plurality of processes in the image processing on the image based on the first image quality condition are executed in a predetermined order, and wherein an order that the scaling and the plurality of processes in the image processing are executed by the second generator is the same as the predetermined order.

* * * * *